US006202805B1

(12) United States Patent
Okada et al.

(10) Patent No.: US 6,202,805 B1
(45) Date of Patent: Mar. 20, 2001

(54) SHOCK ABSORBER HAVING BIDIRECTIONAL VALVE AND FLOW RESTRICTING PASSAGE PARALLEL TO THE VALVE

(75) Inventors: Ichiro Okada, Aichi-ken; Ichisei Kamimura, Okazaki, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/206,304

(22) Filed: Dec. 7, 1998

(30) Foreign Application Priority Data

Dec. 11, 1997 (JP) .................................................. 9-341082
Dec. 11, 1997 (JP) .................................................. 9-341084
Jan. 29, 1998 (JP) .................................................. 10-17359

(51) Int. Cl.[7] ........................................................ F16F 9/34
(52) U.S. Cl. .................................... 188/266.2; 188/282.1; 267/219
(58) Field of Search ................................... 267/219, 161, 267/162; 188/266.3, 266.4, 266.2, 282.1, 282.5, 252.6, 299, 315, 282.2, 299.1

(56) References Cited

U.S. PATENT DOCUMENTS

| 3,199,636 | * | 8/1965 | Carbon . | |
| 4,972,929 | * | 11/1990 | Ivers | 188/322.15 |
| 5,325,942 | * | 7/1994 | Groves | 188/282 |
| 5,706,919 | | 1/1998 | Kruckemeyer et al. . | |

FOREIGN PATENT DOCUMENTS

| 62-114239 | 7/1987 | (JP) . |
| 63-80347 | 5/1988 | (JP) . |
| 1-156338 | 10/1989 | (JP) . |

OTHER PUBLICATIONS

"Instruction Manual for New Model Toyota Soarer," 2 ed., Service Dept., Toyota Jidosha Kabushiki Kaisha, Aug. 2, 1996, pp. 1–19.

* cited by examiner

Primary Examiner—Christopher P. Schwartz
Assistant Examiner—C. T. Bartz
(74) Attorney, Agent, or Firm—Oliff & Berridge, PLC

(57) ABSTRACT

Shock absorber including a cylinder body and a piston cooperating to two chambers one and the other of which respectively function as high-pressure and low-pressure chambers, a piston rod fixed to the piston, and a damping force control device including (i) a hard valve which permits a flow of a working fluid from the high-pressure chamber toward the low-pressure chamber when a difference between fluid pressures in the high-pressure and low-pressure chambers is larger than a predetermined threshold, (ii) a soft valve which permits the fluid flow from the high-pressure chamber toward the low-pressure chamber when the pressure difference is not larger than the threshold, and (iii) a flow restricting fluid passage disposed in parallel with at least one of the hard and soft valves, and wherein at least one of the hard and soft valves and the soft valve permits a flow of the fluid therethrough during both elongation and contraction of the shock absorber.

17 Claims, 28 Drawing Sheets

SHOCK ABSORBER HAVING BIDIRECTIONAL VALVE AND FLOW RESTRICTING PASSAGE PARALLEL TO THE VALVE

This application is based on Japanese Patent Applications Nos. 9-341082 and 9-341084 both filed on Dec. 11, 1997 and No. 10-17359 filed Jan. 29, 1998, the contents of which are incorporated hereinto by reference.

BACKGROUND OF THE INVENTION

1. Field of the Invention

The present invention relates in general to a shock absorber, and more particularly to a shock absorber including a damping force control device, in particular, a damping force control device using leaf valves.

2. Discussion of the Related Art

A shock absorber including a damping force control device is known. An example of this type of shock absorber is disposed on page 15, second edition of "Instruction Manual for New Model TOYOTA SOARER" published on Aug. 2, 1996 by Servicing Department, Toyota Jidosha Yabushiki, Kaisha, the assignee of this application. The shock absorber disclosed in this Instruction Manual includes (a) a cylinder body, (b) a piston received in the cylinder body and cooperating with the cylinder body to define tow chambers on the opposite sides of the piston, one and the other of the two chambers respectively functioning as a high-pressure chamber and a low-pressure chamber in which a pressure of a working fluid is lower than that in the high-pressure chamber, (c) a piston rod fixed to the piston, and (d) a damping force control device including (i) a hard valve which permits a flow of the working fluid therethrough from the high-pressure chamber toward the low-pressure chamber when a difference between the pressures in the high-pressure and low-pressure chambers is larger than a predetermined threshold, (ii) a soft valve which permits the flow of the working fluid therethrough from the high-pressure chamber toward the low-pressure chamber when the above-indicated difference is not larger than the predetermined threshold, and (iii) a variable flow restrictor device for controlling a cross sectional area of fluid flow of a hard-valve by-passing passage which is formed in parallel with the hard valve.

In the shock absorber disclosed in the above-identified Instruction Manual, the variable flow restrictor device is associated with the hard-valve by-passing passage which is provided in parallel with the hard valve, while the soft valve is disposed in series with the variable flow restrictor device and in parallel with the hard valve. While the difference between the pressures of the working fluid in the high-pressure and low-pressure chambers is not larger than the predetermined threshold, namely, while the hard valve is held closed, the working fluid is forced to flow from the high-pressure chamber toward the low-pressure chamber through the soft valve and the hard-valve by-passing passage. When the hard valve is opened, a portion of the working fluid flows through the hard valve toward the low-pressure chamber. A resistance to the flow of the working fluid through the hard-valve by-passing passage decreases as the cross sectional area of fluid flow of the by-passing passage is increased. Accordingly, the damping force generated by the shock absorber decreases with an increase in the cross sectional area of fluid flow of the hard-valve by-passing passage, provided the velocity of movement of the piston relative to the cylinder body (i.e., the operating speed of the shock absorber) is held constant. Thus, the damping force of the shock absorber is controlled by the variable flow restrictor device by controlling the cross sectional are of fluid flow of the hard-valve by-passing passage.

In the shock absorber disclosed in the above-identified Instruction Manual, each of the hard valve and the soft valve includes an elongation valve and a contraction valve. The elongation valve permits a flow of the fluid therethrough from the high-pressure chamber toward the low-pressure chamber only when an assembly consisting of the cylinder body and the piston rod is elongated with a relative movement of the piston rod and the cylinder body in the direction away from each other. The contraction valve permits a flow of the fluid therethrough from the high-pressure chamber toward the low-pressure chamber when the assembly of the cylinder body and the piston rod is contracted with a relative movement of the piston rod and the cylinder body in the direction toward each other. The provision of the elongation and contraction valves for each of the hard and soft valves results in an increase in the structural complexity of the piston within the cylinder body, and an undesirable increase in the size of the shock absorber.

The above problem is encountered not only where the hard valve is disclosed in parallel with the soft valve and the hard-valve by-passing passage, but also where the hard valve is disposed in parallel with the hard-valve by-passing passage, while the soft valve is disposed in series with a parallel circuit of the hard valve and the hard-valve by-passing passage, and where a soft-valve by-passing passage is provided in parallel with the soft valve.

In the known shock absorber indicated above, the working fluid does not flow from the high-pressure chamber toward the low-pressure chamber, inhibiting a relative movement between the piston rod and the cylinder body while a load acting on the shock absorber is not large enough to open the soft valve, that is, while the soft valve is held closed. When the soft valve is opened, the fluid flows through the soft valve and the hard-valve by-passing passage, permitting the above-indicated relative movement. When the load acting on the shock absorber is large enough to open the hard valve, a portion of the fluid flows through the hard valve. The damping force changes with the operating speed of the shock absorber, as shown by solid line in FIG. 30A.

Although the damping force of the known shock absorber is controlled as described above, this chock absorber is not capable of controlling its damping force, as shown by solid lines in FIGS. 30B and 30C, when the hard valve is open or when neither the soft valve nor the hard valve is open, while the operating speed (relative movement of the piston rod and the cylinder body) is considerably low.

JP-A-62-114239 shows a shock absorber including a valve consisting of two leaf valves superposed on each other. in the direction of their thickness, so as to permit the working fluid to flow from a high-pressure chamber toward a low-pressure chamber. These two leaf valves are both flexed concurrently irrespectively of the operating state of the shock absorber. Accordingly, the shock absorber does not have a sufficient degree of freedom of design, in terms of the damping characteristics, in particular.

SUMMARY OF THE INVENTION

It is therefore a principal object of the present invention to provide a shock absorber which is simple in construction and which has an improved function of controlling its damping force.

It is a first optional object of the present invention to provide a shock absorber which includes a damping force control device and wherein the piston is simple in construction.

It is a second optional object of the present invention to provide a shock absorber which is capable of controlling its damping force when the hard valve is open or when neither the soft valve nor the hard valve is open, while the operating speed is considerably low.

The principal object indicated above may be achieved according to any one of the following modes of the present invention, each of which is numbered like the appended claims and depends from the other mode or modes, as needed, so as to indicate possible combinations of elements or features in preferred forms of the present invention.

(1) A shock absorber comprising: a cylinder body; a piston received in the cylinder body and cooperating with the cylinder body to define two chambers on opposite sides of the piston, one and the other of the two chambers respectively functioning as a high-pressure chamber and a low-pressure chamber in which a pressure of a working fluid is lower than that in the high-pressure chamber; a piston rod fixed to the piston; a damping force control device including (i) a hard valve which permits a flow of the working fluid from the high-pressure chamber toward the low-pressure chamber when a difference between the pressures in the high-pressure and low-pressure chambers is larger than a predetermined threshold, (ii) a soft valve which permits the flow of the working fluid from the high-pressure chamber toward the low-pressure chamber when the difference is not larger than the threshold, and (iii) a flow restricting fluid passage which has a function of restricting a flow of the working fluid therethrough and which is disposed in parallel with at least one of the hard valve and the soft valve; and at least one of the hard valve and the soft valve permits a flow of the working fluid therethrough from the high-pressure chamber toward the low-pressure chamber during both elongation and contraction of an assembly consisting of the cylinder body and the piston-rod.

In the shock absorber constructed according to the above mode (1), the hard valve and the soft valve are provided, and at least one of these hard and soft valves is bidirectionally operated or opened, namely, permits a flow of the working fluid therethrough both when the shock absorber is elongated with the piston rod being moved away from the cylinder body, and when the shock absorber is contracted with the piston rod being moved toward the cylinder body. The use of the bidirectionally opened hard or soft valve or the bidirectionally opened hard and soft valves makes it possible to simplify the construction of the piston, since each of the hard and soft valves does not have the elongation valve and the contraction valve as provided in the conventional shock absorber. Further, the flow restricting fluid passage assures an improved function of controlling the damping force generated by the shock absorber.

The first optional object indicted above as well as the principal object also indicated above may be achieved according to any one of the following modes (2) through (7):

(2) A shock absorber comprising: a cylinder body; a piston received in the cylinder body and cooperating with the cylinder body to define two chambers on opposite sides of the piston, one and the other of the two chambers respectively functioning as a high-pressure chamber and a low-pressure chamber in which a pressure of a working fluid is lower than that in the high-pressure chamber; a piston rod fixed to the piston; a damping force control device including (i) a hard valve which permits a flow of the working fluid from the high-pressure chamber toward the low-pressure chamber when a difference between the pressures in the high-pressure and low-pressure chambers is larger than a predetermined threshold, (ii) a soft valve which permits the flow of the working fluid from the high-pressure chamber toward the low-pressure chamber when the difference is not larger than the threshold, and (iii) a variable flow restrictor device for controlling a cross sectional area of flow of the working fluid through a hard-valve by-passing passage formed in parallel with the hard valve; and wherein both of the hard valve and the soft valve permit a flow of the working fluid therethrough from the high-pressure chamber toward the low-pressure chamber during both elongation and contraction of an assembly consisting of the cylinder body and the piston rod; and wherein the hard and soft valves are disposed in respective two axially opposite portions of the piston which partially define the two chambers, respectively, the piston having an intermediate fluid passage connecting the hard and soft valves, and wherein the hard-valve by-passing passage is open at one of opposite ends thereof to one of the two chambers which is located on the side of the hard valve, and at the other end thereof to the intermediate fluid passage.

In the shock absorber constructed according to the above mode (2) of this invention, both of the hard and soft valves are bidirectionally opened, namely, permit a flow of the fluid therethrough during both the elongation and the contraction of the shock absorber. Thus, the present shock absorber does not have both the elongation valve and the contraction valve as provided in the known shock absorber.

Further, the hard and soft valves are disposed in the respective axially opposite portions of the piston which are exposed to the respective two chambers, and the intermediate fluid passage is formed in the piston. The hard-valve by-passing passage is open at one of its opposite ends to the chamber partially defined by the hard valve, and at the other end to the intermediate fluid passage. Owing to this arrangement, the piston can be simplified in construction and small-sized.

When the fluid pressure difference of the high-pressure and low-pressure chambers is not larger than the predetermined threshold, the fluid is forced to flow through the soft valve and the hard-valve by-passing passage from the high-pressure chamber toward the low-pressure chamber. A resistance to a flow of the fluid through the hard-valve by-passing passage decreases with an increase in the cross sectional area of flow of the fluid of this by-passing passage, so that the damping force generated by the shock absorber decreases as the cross sectional area of fluid flow of the by-passing passage is increased.

When the fluid pressure of the two chambers is larger than the threshold, the fluid is forced to flow, partly through the soft valve and the hard valve, and partly through the soft valve and the hard-valve by-passing passage. In this state, too, the damping force decreases with an increase in the cross sectional area of fluid flow of the hard-valve by-passing passage.

(3) A shock absorber according to the above mode (2), wherein each of at least one of the hard and soft valves includes (a) a leaf valve in the form of a generally annular sheet member having opposite surfaces one of which is exposed to one of the two chambers and the other of which is exposed to the intermediate fluid passage, (b) a first seat member for supporting the leaf valve at one of radially inner and outer peripheral portions thereof, on the side of the above-indicated one of the two chambers, and (c) a second seat member for supporting the leaf valve at the other of the radially inner and outer peripheral portions, on the side of the intermediate fluid passage.

One of the opposite surfaces of the leaf valve receives a force based on the fluid pressure in one of the high-pressure and low-pressure chambers, while the other surface receives a force based on the fluid pressure in the intermediate fluid passage. When the fluid pressure in the intermediate fluid passage is higher than that in the above-indicated one chamber by more than a predetermined opening pressure difference, the leaf valve is pressed at one of its radially inner and outer peripheral portions against the first seat member, and is fixed at the other peripheral portion, whereby the leaf valve is opened in a first direction, permitting the fluid to flow from the intermediate fluid passage toward the above-indicated one chamber.

When the fluid pressure in the above-indicated one of the high-pressure and low-pressure chambers is higher than that in the intermediate fluid passage by more than the predetermined opening pressure difference, the leaf valve is pressed at the other of its radially inner and outer peripheral portions, whereby the leaf valve is opened in a second direction opposite to the above-indicated first direction, permitting the fluid to flow from the above-indicated one chamber toward the intermediate fluid passage.

The leaf valve, which is a generally annular sheet member, is either flexed at its radially outer portion about its radially inner peripheral portion, or flexed at its radially inner portion about its radially outer peripheral portion. Generally, the leaf valve is more easily flexed at its radially outer portion than at its radially inner portion. Accordingly, each of the hard and soft valves is flexed at different values of the fluid pressure difference on its opposite sides, during the elongation and contraction of the shock absorber, respectively. Since it is desired to provide a larger damping force during the elongation of the shock absorber than during the contraction, it is desired to construct the leaf valve such that the leaf valve is flexed at its radially inner portion during the elongation of the shock absorber.

The hard or soft valve may use a single leaf valve or a plurality of leaf valves which are superposed on each other in the axial direction.

(4) A shock absorber according to the above mode (2) or (3), wherein each of the at least one of the hard and soft valves includes a leaf valve in the form of a generally annular sheet member, and a positioning member disposed on one of radially inner and outer sides of the leaf valve, for positioning the leaf valve such that the positioning member engages the leaf valve, the positioning member having cutouts formed in one of radially inner and outer peripheral portions thereof which corresponds to the other of the radially inner and outer sides of the leaf valves.

The positioning member is located radially inwardly or outwardly of the leaf valve. Alternatively, two positioning members may be disposed radially inwardly and outwardly of the leaf valve, respectively. Where the positioning member is located radially inwardly of the annular leaf valve, the cutouts are formed in the radially outer peripheral portion of the positioning member. Where the positioning member is located radially outwardly of the leaf valve, the cutouts are formed in the radially inner peripheral portion of the positioning member. Where the leaf valve is flexed at its radially inner or outer portion whose periphery engages the positioning member, the cutouts formed through the positioning member permit the fluid to flow therethrough even in an initial period of flexing of the leaf valve in which the periphery of the leaf valve adjacent to the positioning member is located within the thickness of the positioning member. Where the soft valve uses the positioning member having such cutouts, the shock absorber is permitted to be elongated and contracted while the load acting on the shock absorber is smaller than where the positioning member does not have such cutouts.

The positioning member may have a single cutout. However, the positioning member preferably has a plurality of cutouts. Where the cross sectional area of each cutout in a plane perpendicular to the direction of the thickness of the positioning member (direction of the fluid flow) is small enough to enable the cutout to function as a flow restrictor, the damping characteristic of the leaf valve can be changed by forming the cutout such that the cross sectional area changes in the direction of thickness (direction of the fluid flow through the cutout). Namely, a desired relationship between the amount of flexure of the leaf valve and the flow restricting effect of the cutout can be obtained by changing the cross sectional area of the cutout in the direction of thickness of the positioning member.

(5) A shock absorber according to any one of the above modes (2)–(4), wherein the hard and soft valves include respective leaf valves each in the form of a generally annular sheet member, the leaf valve of the soft valve being more flexible than the leaf valve of the hard valve.

The leaf valves of the hard and soft valves may be suitably shaped or dimensioned, or may be formed of suitably selected different materials, so that the leaf valve of the soft valve is more flexible than that of the hard valve. For instance, a ratio of the outside diameter of the leaf valve of the soft valve to its inside diameter is made larger than that of the leaf valve of the hard valve. Alternatively, a difference between the outside and inside diameters of the leaf valve of the soft valve is made larger than that of the leaf valve of the hard valve. It is also possible to reduce the flexibility of the leaf valve of the soft valve, by reducing its thickness.

(6) A shock absorber comprising: a cylinder body; a piston received in the cylinder body and cooperating with the cylinder body to define two chambers on opposite sides of the piston, one and the other of the two chambers respectively functioning as a high-pressure chamber and a low-pressure chamber in which a pressure of a working fluid is lower than that in the high-pressure chamber; a piston rod fixed to the piston; a damping force control device including (i) a hard valve which permits a flow of the working fluid from the high-pressure chamber toward the low-pressure chamber when a difference between the pressures in the high-pressure and low-pressure chambers is larger than a predetermined threshold, (ii) a soft valve which permits the flow of the working fluid from the high-pressure chamber toward the low-pressure chamber when the difference is not larger than the threshold, and (iii) a flow restricting hard-valve by-passing passage which has a function of restricting a flow of the working fluid therethrough and which is disposed in parallel with the hard valve; and wherein at least one of the hard valve and the soft valve permits a flow of the working fluid therethrough from the high-pressure chamber toward the low-pressure chamber during both elongation and contraction of an assembly consisting of the cylinder body and the piston rod.

In the shock absorber constructed according to the above mode (6) of this invention, at least one of the hard and soft valves is bidirectionally opened, namely, permits a flow of the fluid therethrough during both elongation and contraction of the shock absorber. Accordingly, the construction of the piston can be simplified.

The hard and soft valves may be constructed as described above with respect to the above modes (3), (4) and (5).

Further, a variable flow restrictor device may be provided for controlling or changing the cross sectional area of flow of the fluid through the hard-valve by-passing passage, so that the damping force generated by the shock absorber can be controlled.

In the present shock absorber wherein the hard valve is disposed in parallel with the hard-valve by-passing passage, the soft valve may be disposed in series with a parallel circuit of the hard valve and the hard-valve by-passing passage, or disposed in parallel with a soft-valve by-passing passage. Alternatively, the hard valve may be disposed in parallel with a series connection of the soft valve and the hard-valve by-passing passage.

(7) A shock absorber comprising: a cylinder body; a piston received in the cylinder body and cooperating with the cylinder body to define two chambers on opposite sides of the piston, one and the other of the two chambers respectively functioning as a high-pressure chamber and a low-pressure chamber in which a pressure of a working fluid is lower than that in the high-pressure chamber; a piston rod fixed to the piston; a damping force control device including (i) a hard valve which permits a flow of the working fluid from the high-pressure chamber toward the low-pressure chamber when a difference between the pressures in the high-pressure and low-pressure chambers is larger than a predetermined threshold, (ii) a soft valve which permits the flow of the working fluid from the high-pressure chamber toward the low-pressure chamber when the difference is not larger than the threshold, and (iii) a flow restricting hard-valve by-passing passage which has a function of restricting a flow of the working fluid therethrough and which is disposed in parallel with the hard valve; and wherein both of the hard valve and the soft valve permit a flow of the working fluid therethrough from the high-pressure chamber toward the low-pressure chamber during both elongation and contraction of an assembly consisting of the cylinder body and the piston rod, the hard and soft valves are disposed in respective two axially opposite portions of the piston which partially define the two chambers, respectively; and wherein the piston has an intermediate fluid passage connecting the hard and soft valves, the flow restricting hard-valve by-passing passage being open at one of opposite ends thereof to one of the two chambers which is located on the side of the hard valve, and at the other end thereof to the intermediate fluid passage.

The flow restricting hard-valve by-passing passage may have a predetermined constant cross sectional area of fluid flow, or its cross sectional area of fluid flow may be changed by a suitable variable flow restrictor device.

The second optional object indicated above as well as the principal object also indicated above may be achieved according to any one of the following modes (8) through (15) of the invention:

(8) A shock absorber comprising: a cylinder body; a piston received in the cylinder body and cooperating with the cylinder body to define two chambers on opposite sides of the piston, one and the other of the two chambers respectively functioning as a high-pressure chamber and a low-pressure chamber in which a pressure of a working fluid is lower than that in the high-pressure chamber; a piston rod fixed to the piston; a damping force control device including (i) a hard valve which permits a flow of the working fluid from the high-pressure chamber toward the low-pressure chamber when a difference between the pressures in the high-pressure and low-pressure chambers is larger than a predetermined threshold, (ii) a soft valve which permits the flow of the working fluid from the high-pressure chamber toward the low-pressure chamber when the difference is not larger than the threshold, (iii) a flow restricting soft-valve by-passing passage which has a function of restricting a flow of the working fluid therethrough and which is disposed in parallel with the soft valve, and (iv) a variable flow restrictor device for controlling a cross sectional area of flow of the fluid through the flow restricting soft-valve by-passing passage.

In the shock absorber constructed according to the above mode (8) of this invention, the soft and hard valves may be connected in series with each other, without a hard-valve by-passing passage in parallel with the hard valve. In this case, the fluid is not permitted to flow between the two chambers, inhibiting a relative movement of the piston rod (piston) and the cylinder body, before the hard valve is opened. When the hard valve is opened, the fluid is forced to flow through the soft valve and the soft-valve by-passing passage, and through the hard valve, permitting the relative movement of the piston rod and the cylinder body. A ration of the amount of flow of the fluid through the soft-valve by-passing passage to that through the soft valve is determined by the cross sectional area of fluid flow of the soft-valve by-passing passage, and the damping force is changed as indicated by solid line in FIG. 30B.

Thus, the present shock absorber is capable of effecting the control of the damping force which is not possible in the known shock absorber. For instance, the present shock absorber is capable of controlling the damping force when the hard valve is open while the velocity of the relative movement of the piston rod and the cylinder body is considerably low, that is, while the operating speed of the shock absorber is considerably low.

(9) A shock absorber according to the above mode (8), wherein the hard valve and the soft valve are connected in series with each other.

(10) A shock absorber according to the above mode (9), wherein the damping force control device further includes a flow restricting hard-valve by-passing passage which has a function of restricting a flow of the working fluid therethrough and which is disposed in parallel with the hard valve.

In the shock absorber according to the above mode (10), both the soft-valve by-passing passage and the hard-valve by-passing passage are provided, so that the fluid is permitted to flow through these by-passing passages even before the soft and hard valves are opened. In this state, the damping-force generated by the shock absorber can be controlled as indicated by solid line in FIG. 30C, by controlling the cross sectional area of flow of the fluid through the soft-valve by-passing passage. Thus, the damping force can be controlled even when neither the soft valve nor the hard valve is open while the load acting on the shock absorber is extremely small. It is noted that a variable flow restrictor device may be provided for the hard-valve by-passing passage.

(11) A shock absorber according to any one of the above modes (8), (9) and (10), wherein at last one of the hard valve and the soft valve permits a flow of the working fluid therethrough from the high-pressure chamber toward the low-pressure chamber during both elongation and contraction of an assembly consisting of the cylinder body and the piston rod.

In the shock absorber disclosed in the second edition of "Instruction Manual for New Model TOYOTA SOARER" identified in the Discussion of the Related Art, each of the hard and soft valves includes both an elongation valve adapted to be opened only during elongation of the shock absorber, and a contraction valve adapted to be opened only during contraction of the shock absorber. The use of the elongation valve and contraction valve for each of the hard and soft valves increases the structural complexity of the piston. In the present shock absorber, however, the construction of the piston is simplified since the soft or hard valve or each of the soft and hard valves is bidirectionally opened, permitting the fluid flow in the opposite directions during the elongation and contraction of the shock absorber, respectively.

(12) A shock absorber according to any one of the above modes (8)–(11), wherein both of the hard valve and the soft valve permit the flow of the working fluid therethrough from the high-pressure chamber toward the low-pressure chamber during both elongation and contraction of an assembly consisting of the cylinder body and the piston rod, and the hard and soft valves are disposed in respective two axially opposite portions of the piston (28) which partially define the two chambers, respectively.

In the shock absorber according to the above mode (12) wherein the hard and soft valves are disposed in the respective axially opposite portions of the piston, the required size of the piston can be reduced.

(13) A shock absorber according to any one of the above modes (8)–(12), wherein the piston has an intermediate fluid passage connecting the hard and soft valves, and each of at least one of the hard and soft valves includes (a) a leaf valve in the form of a generally annular sheet member having opposite surfaces one of which is exposed to one of the two chambers and the other of which is exposed to the intermediate fluid passage, (b) a first seat member for supporting the leaf valve at one of radially inner and outer peripheral portions thereof, on the side of the above-indicated one of the two chambers, and (c) a second seat member for supporting the leaf valve at the other of the radially inner and outer peripheral portions, on the side of the intermediate fluid passage.

The shock absorber constructed according to the above mode (13) of this invention has the advantage as described above with respect to the mode (3) of this invention.

(14) A shock absorber according to any one of the above modes (8)–(13), wherein both of the hard and soft valves include respective leaf valves each in the form of a generally annular sheet member, the leaf valve of the soft valve is more flexible than the leaf valve of the hard valve.

The shock absorber according to the above mode (14) has the advantages as described above with respect to the mode (5).

(15) A shock absorber comprising: a cylinder body; a piston received in the cylinder body and cooperating with the cylinder body to define two chambers on opposite sides of the piston, one and the other of the two chambers respectively functioning as a high-pressure chamber and a low-pressure chamber in which a pressure of a working fluid is lower than that in the high-pressure chamber; a piston rod fixed to the piston; a damping force control device including (i) a hard valve which permits a flow of the working fluid from the high-pressure chamber toward the low-pressure chamber when a difference between the pressures in the high-pressure and low-pressure chambers is larger than a predetermined threshold, (ii) a soft valve which permits the flow of the working fluid from the high-pressure chamber toward the low-pressure chamber when the difference is not larger than the threshold, and (iii) at least one of (a) a first variable flow restrictor device for controlling a cross sectional area of flow of the fluid through a soft-valve by-passing passage which is disposed in parallel with the soft valve, and (b) a second variable flow restrictor device for controlling a cross sectional area of flow of the fluid through a hard-valve by-passing passage which is disposed in parallel with the hard valve; and at least one of the hard valve and the soft valve permitting a flow of the working fluid therethrough from the high-pressure chamber toward the low-pressure chamber during both elongation and contraction of an assembly consisting of the cylinder body and the piston rod.

(16) A shock absorber comprising: a cylinder body; a piston received in the cylinder body and cooperating with the cylinder body to define two chambers on opposite sides thereof, one and the other of the two chambers respectively functioning as a high-pressure chamber and a low-pressure chamber in which a pressure of a working fluid is lower than that in the high-pressure chamber; a piston rod fixed to the piston; and a valve device which permits a flow of the working fluid from the high-pressure chamber toward the low-pressure chamber, and wherein the valve device includes a plurality of leaf valves superposed on each other, and wherein the plurality of leaf valves are arranged such that the number of the plurality of leaf valves to be flexed concurrently changes depending upon an operating state of the shock absorber.

In the shock absorber according to the above mode (16) of this invention, the plurality of leaf valves are arranged such that the number of the plurality of leaf valves to be flexed concurrently changed depending upon the operating state of the shock absorber. Generally, the leaf valves are more easily flexed when the number of the leaf valves to be flexed concurrently is relatively small than when the number is relatively large. Therefore, the opening pressure difference and the damping coefficient of the valve device decreases with a decrease in the number of the leaf valves that are concurrently flexed when the valve device is opened. The damping coefficient is a rate of increase in the damping force with an increase in the velocity of the relative movement of the piston rod and the cylinder body. The valve device exhibits different damping characteristics corresponding to different numbers of the leaf valves that are concurrently flexed. Accordingly, the present shock absorber has an increased degree of freedom of design in terms of the damping characteristics.

Each of the leaf valves provided in the shock absorber according to the above mode (16) is flexed during at least one of the elongation and contraction of the shock absorber. For instance, the leaf valve is flexed during the elongation, but not flexed during the contraction. All of the leaf valves, each of which is flexed in at least one operating state of the shock absorber, need not be adapted to be seated on and unseated from a seat member. For instance, the valve device includes three annular sheet members, an inner seat member disposed on the side of one of the two chambers, and an outer seat member disposed on the side of the other chamber. In this example, only one of the leaf valves which is located nearest to the above-indicated one chamber is flexed when the fluid pressure in the other chamber is higher than that in the above-indicated one chamber, and all of the three leaf valves are flexed when the fluid pressure in the above-indicated one chamber is higher than that in the above-indicated other chamber. In the former case where the fluid pressure in the above-indicated other chamber is higher, the above-indicated one leaf valve is pressed at its radially inner peripheral portion against the inner seat member and is flexed at its radially outer portion. This outer portion of the above-indicated one leaf valve is not seated on and unseated from the outer seat member, but is seated on and unseated from the intermediate leaf valve. Thus, the above-indicated one leaf valve is flexed in one operating state of the shock absorber, but is not seated and unseated on and from any seat member. Similarly, the leaf valve nearest to the other chamber is not seated on and unseated from the inner seat member when this leaf valve is flexed at its radially inner portion. The intermediate leaf valve, which is flexed when the fluid pressure in the above-indicated one chamber is higher, is not seated and unseated on and from either of the outer and inner seat members.

As explained in detail with respect to the mode (19) of this invention which will be described, the number of the leaf valves to be concurrently flexed may be changed depending upon whether the difference between the fluid pressures in the high-pressure and low-pressure chambers is higher than the predetermined threshold or not. Alternatively, the number may be changed depending upon whether the shock absorber is elongated or contracted, as described below with respect to the following mode (18) of the invention, where the valve device is adapted to permit a flow of the fluid therethrough during both the elongation and the contraction of the shock absorber, as in the following mode (17) of the invention.

(17) A shock absorber according to the above mode (16), wherein the valve device permits the flow of the working fluid from the high-pressure chamber toward the low-pressure chamber during both elongation and contraction of the assembly.

In the shock absorber according to the above mode (17), the valve device is bidirectionally opened, permitting the fluid flow during both the elongation and the contraction of the shock absorber. Accordingly, the shock absorber can be simplified in construction, for the reason explained above.

(18) A shock absorber according to the above mode (16) or (17), wherein the number of the leaf valves to be concurrently flexed changes depending upon whether the assembly is elongated or contracted.

In the shock absorber according to the above mode (18), the shock absorber exhibits different damping characteristics during the elongation and contraction. That is, the damping force generated during the elongation differs from that during the contraction, provided the velocity of the relative movement of the piston rod and the cylinder body is constant. The number of the leaf valves to be concurrently flexed during the elongation may be either larger or smaller than that during the contraction. Generally, the number is preferably larger during the elongation since a larger damping force is desired during the elongation than during the contraction. For example, one or more of the plurality of leaf valves is/are flexed during the contraction, and all of the plurality of leaf valves are flexed during the elongation. Where the valve device includes three leaf valves, one or two of the leaf valves is/are flexed during the contraction, and two or three of the leaf valves are flexed during the elongation.

(19) A shock absorber according to any one of the above modes (16)–(18), wherein the number changes depending upon whether the difference between the pressures in the high-pressure and low-pressure chambers is larger than the predetermined threshold or not.

In the shock absorber according to the above mode (19), the damping characteristic can be changed depending upon whether the fluid pressure difference of the high-pressure and low-pressure chambers is larger than the threshold or not. Where the number of the leaf valves to be concurrently flexed is smaller when the fluid pressure difference is not larger than the threshold, the leaf valve or valves can be flexed while the load acting on the shock absorber is comparatively small. In this case, the valve device has a comparatively small opening pressure difference, and is capable of controlling the comparatively small damping force.

The freedom of design of the shock absorber according to the above mode (19) can be further improved in terms of the damping characteristic, where the present shock absorber incorporates the feature according to the above mode (18). Where the valve device includes three leaf valves and where the three leaf valves are all flexed during the elongation, and only one of the three leaf valves is flexed during the contraction, for example, it is possible to construct the three leaf valves such that, during the contraction, one of the three leaf valves is flexed when the fluid pressure difference is not larger than the threshold, and two or three of the three leaf valves are flexed when the fluid pressure difference larger than the threshold. (20) A shock absorber according to any one of the above modes (16)–(19), wherein the plurality of leaf valves includes at least one initially flexed leaf valve which is flexed when the difference is larger than a predetermined first threshold, and at least one subsequently flexed leaf valve which is not flexed until the difference has exceeded a predetermined second threshold which is larger than the predetermined first threshold.

In the shock absorber according to the above mode (20), only the initially flexed leaf valve or valves is/are flexed, or alternatively, the initially flexed valve or valves and the subsequently flexed leaf valve or valves are flexed. Where the valve device includes a plurality of subsequently flexed leaf valves, the initially flexed leaf valve or valves and at least one of the plurality of subsequently flexed leaf valves may be flexed.

Where the leaf valves are superposed on each other in the direction of the thickness, the at least one initially flexed leaf valve includes one of the two outermost leaf valves, while the rest of the leaf valves functions as the at least one subsequently flexed leaf valve.

(21) A shock absorber according to the above mode (20), wherein the at least one subsequently flexed leaf valve has passage means for applying to the at least one initially flexed leaf valve the pressure of the fluid in one of the two chambers to which the at least one subsequently flexed leaf valve is exposed.

In the shock absorber according to the above mode (21), the fluid pressure in the chamber to which the at least one subsequently flexed leaf valve is exposed is applied to the at least one initially flexed leaf valve through the passage means. Thus, the fluid pressure in the above-indicated one of the two chambers acts on the surface of the at least one initially flexed leaf valve which is nearest to the at least one subsequently flexed leaf valve, while the fluid pressure in the other chamber acts on the surface of the at least one initially flexed leaf valve which is exposed to the other chamber. The at least one initially flexed leaf valve is flexed when the fluid pressure acting on its surface nearest to the at least one subsequently flexed leaf valve becomes larger than the fluid pressure in the above-indicated other chamber.

(22) A shock absorber according to the above mode (21), wherein the passage means includes at least one through-hole formed through a thickness of each of the at least one subsequently flexed leaf valve.

In the shock absorber constructed according to the above mode (22) of the invention, the fluid pressure in the above-indicated one chamber is applied to the at least one initially flexed leaf valve through the passage means which consists of at least one through-hole formed through each of the at least one subsequently flexed leaf valve. Where two or more subsequently flexed leaf valves are superposed on each other, the through-holes of these leaf valves are aligned with each other so as to define the passage means through which the fluid pressure is applied to the at least one initially flexed leaf valve.

The cross sectional area of the passage means in a plane perpendicular to the direction of thickness of the at least one subsequently flexed leaf valve may be constant in the direction of thickness. However, the passage means may have different cross sectional areas, namely, a small-sized portion and a large-sized portion (large-diameter portion and small-diameter portion where the through-hole has a circular cross sectional shape). In this case, the at least one initially flexed leaf valve is desirably exposed to the large-sized portion of the passage means, so that the fluid pressure can be suitably distributed over a relatively large surface area of the initially flexed leaf valve nearest to the at least one subsequently flexed leaf valve.

Where only one subsequently flexed leaf valve is provided, each of the at least one through-hole formed through this leaf valve may have a constant cross sectional area, or portions having different cross sectional areas, as viewed in the direction of thickness of the leaf valve. Where a plurality of subsequently flexed leaf valves are provided, the through-holes formed through these leaf valves may have the same cross sectional area or different cross sectional areas. Each through-hole formed through each of these subsequently flexed leaf valves may have large-sized and small-sized portions.

The number of the leaf valves to be flexed concurrently depending upon the operating state of the shock absorber can be determined by the cross sectional areas of the passage means. Where the passage means has a relatively large constant cross sectional area, only the at least one initially flexed leaf valve is flexed irrespective of the operating speed of the shock absorber, where the fluid pressure in the chamber on the side of the at least one subsequently flexed leaf valve is higher than that in the other chamber. When the fluid pressure in this other chamber on the side of the at least one subsequently flexed leaf valve is higher than that in the chamber on the side of the at least one initially flexed leaf valve, the at least one subsequently flexed leaf valve is flexed together with the at least one initially flexed leaf valve. IN the former case, the fluid pressure in the chamber to which the at least one subsequently flexed leaf valve is exposed is applied through the passage means to the surface of the at least one initially flexed leaf valve which is nearest to the other chamber, so that the initially flexed leaf valve or valves is/are flexed, causing the fluid flow through the passage means. However, the at least one subsequently flexed leaf valve is not flexed since substantially no fluid pressure difference is present on the opposite sides of the subsequently flexed leaf valve, in the presence of the passage means having the large cross sectional area.

Where the passage means has a small-sized portion and a large-sized portion adjacent to the at least one initially flexed leaf valve, the number of the leaf valves to be concurrently flexed is determined depending upon the position of the small-sized portion of the passage means. Where the fluid pressure in the chamber to which the at least one subsequently flexed leaf valve is exposed is higher than that in the other chamber, only the at least one initially flexed leaf valve is flexed when the operating speed of the shock absorber is relatively low. When the operating speed is relatively high, the subsequently flexed leaf valve or valves having the small-sized portion of the passage means and the subsequently flexed leaf valve or valves located between that leaf valve and the at least one initially flexed leaf valve are flexed as well as the at least one initially flexed leaf valve. As the fluid pressure difference increases, the restriction of the fluid flow through the small-sized portion is increased, whereby a fluid pressure difference is caused on the opposite sides of the at least one subsequently flexed leaf valve, causing the at least one subsequently flexed leaf valve to be flexed as well. That is, the leaf valves that are flexed consist of the at least one initially flexed leaf valve, the subsequently flexed leaf valve or valves having the small-sized portion of the passage means, and the subsequently flexed leaf valve or valves located between those initially and subsequently flexed leaf valves.

As described above, the number of the leaf valves to be flexed concurrently depending upon the operating state of the shock absorber can be determined by the cross sectional area of the passage means and the position of the small-sized portion of the passage means in the direction of thickness of the at least one subsequently flexed leaf valve.

In the state in which only the at least one initially flexed leaf valve is flexed when the fluid pressure in the chamber on the side of the at least one subsequently flexed leaf valve is higher, the fluid flows through the passage means and a gap or space between the subsequently and initially flexed leaf valves. In the state in which the initially and subsequently flexed leaf valves are flexed, the fluid flows also through a gap between the leaf valves and a seat member. Where the passage means includes a small-sized portion in the former state, the valve device exhibits a damping characteristic based on a flow restricting effect of the small-sized portion functioning as an orifice, after the at least one initially flexed leaf valve has been flexed. In the latter state in which the initially and subsequently flexed leaf valves are flexed, the valve device exhibits a damping characteristic based on its operating characteristic as a whole. Where all of the leaf valves are flexed when the fluid pressure on the side of the at least one initially flexed leaf valve is higher, too, the damping characteristic is based on the operating characteristic of the valve device as a whole.

(23) A shock absorber according to any one of the above modes (16)–(22), wherein the plurality of leaf valves include three leaf valves superposed on each other, the three leaf valves consisting of an intermediate leaf valve having large through-holes formed therethrough, an initially flexed leaf valve disposed on one of opposite sides of the intermediate leaf valve, and a flow restricting leaf valve disposed on the other of the opposite sides of the intermediate leaf valve and having small through-holes formed therethrough, the small through-holes functioning as a flow restrictor.

When the fluid pressure in one of the two chambers which is located on the side of the flow restricting leaf valve becomes higher than that in the other chamber, the fluid is forced to flow from the above-indicated one chamber through the small through-holes and the large through-holes, and act on the surface of the initially flexed leaf valve on the side of the above-indicated one chamber. When the fluid pressure in the above-indicated one chamber becomes higher than that in the other chamber by more than a difference enough to cause flexure of the initially flexed leaf valve, this initially flexed leaf valve is flexed, permitting the fluid flow through the valve device. Where the initially flexed leaf valve has a relatively high degree of flexibility, the valve device is opened even when the fluid pressure difference of the two chambers is relatively small (even when the load acting on the shock absorber is relatively small). The intermediate leaf valve and the flow restricting leaf valve are both flexed together when the load acting on the shock absorber has increased to a value at which the fluid pressure in the above-indicated one chamber is higher than that in the other chamber by more than a difference enough to cause flexure of those two leaf valves. In this state, all of the three leaf valves are flexed.

When the fluid pressure in the above-indicated other chamber becomes higher than that in the above-indicated other chamber by more than a difference enough to cause flexure of the three leaf valves, these three leaf valves are all flexed.

The intermediate leaf valve having the large through-holes may be replaced by a leaf valve which is shaped, positioned or dimensioned so as not to close the small through-holes formed in the flow restricting leaf valve.

(24) A shock absorber according to any one of the above modes (16)–(19), wherein the plurality of leaf valves include two leaf valves which are positioned such that one of the two leaf valves is superposed on a portion of the other of the two leaf valves.

In the shock absorber according to the above mode (24), the above-indicated other leaf valve has two portions, one of which is superposed on the above-indicated one leaf valve, and the other of which is not superposed on the above-indicated one leaf valve. In this arrangement, only the above-indicated other leaf valve is flexed, or the two leaf valves are flexed, depending upon the operating state of the shock absorber.

(25) A shock absorber comprising: a cylinder body; a piston received in the cylinder body and cooperating with the cylinder body to define two chambers on opposite sides thereof, one and the other of the two chambers respectively functioning as a high-pressure chamber and a low-pressure chamber in which a pressure of a working fluid is lower than that in the high-pressure chamber; a piston rod fixed to the piston; and a valve device which permits a flow of the working fluid from the high-pressure chamber toward the low-pressure chamber, and wherein the valve device generates a damping force whose characteristic changes depending upon an operating state of the shock absorber.

The valve device may includes a plurality of leaf valves as described above with respect to the above form (16). That is, the characteristic of the damping force generated by the valve device is changed by changing the number of the leaf valves to be concurrently flexed, depending upon the operating state of the shock absorber. The valve device may be constructed as described above with respect to the forms (17)–(24).

(26) A shock absorber comprising: a cylinder body; a piston received in the cylinder body and cooperating with the cylinder body to define two chambers on opposite sides thereof, one and the other of the two chambers respectively functioning as a high-pressure chamber and a low-pressure chamber in which a pressure of a working fluid is lower than that in the high-pressure chamber; a piston rod fixed to the piston; a hard valve which permits a flow of the working fluid from the high-pressure chamber toward the low-pressure chamber when a difference between the pressures in the high-pressure and low-pressure chambers is larger than a predetermined threshold; a soft valve which permits a flow of the fluid from the high-pressure chamber toward the low-pressure chamber when the above-indicated difference is not larger than the predetermined threshold; and a flow restricting hard-valve by-passing passage which has a function of restricting a flow of the working fluid therethrough and which is disposed in parallel with the hard valve, and wherein each of at least one of the hard valve and the soft valve includes a plurality of leaf valves superposed on each other, and wherein the plurality of leaf valves are arranged such that the number of the plurality of leaf valves to be flexed concurrently changes depending upon an operating state of the shock absorber.

The above-indicated plurality of leaf valves whose number of current flexing changes depending upon the operating state of the shock absorber may be used for only the hard valve, or only the soft valve, or alternatively, for both of the hard and soft valves. In the present shock absorber wherein the flow restricting hard-valve by-passing passage is provided in parallel with the hard valve, it is preferable that at least the soft valve include the leaf valves whose number of concurrent flexing changes depending upon the operating state of the shock absorber.

At least one of the soft and hard valves may be arranged to have any one of the features described above with respect to the above modes (17)–(24). The soft valve and the hard valve may have the same construction. Where the soft and hard valves have different constructional arrangements, any combination of the features described with respect to the above modes (16)–(24) may be employed.

(27) A shock absorber according to the above mode (26), wherein each of both of the hard and soft valves permits a flow of the fluid therethrough from the high-pressure chamber toward the low-pressure chamber during both elongation and contraction of an assembly consisting of the cylinder body and the piston rod, and the hard and soft valves are disposed in respective two axially opposite portions of the piston which partially define the two chambers, respectively, and wherein the flow restricting hard-valve by-passing passage is formed in the piston and is open at one of opposite ends thereof to one of the two chambers which is located on the side of the hard valve, and at the other end to the intermediate fluid passage.

According to the following modes of the present invention, there is also provided a leaf valve for a shock absorber:

(28) A leaf valve for a shock absorber, which includes a generally annular sheet member having at least one through-hole formed through a thickness thereof between radially inner and outer peripheries thereof.

The leaf valve according to the above mode (28) may be a flow restricting leaf valve or an intermediate leaf valve as used in the shock absorber according to the above mode (23) of the invention.

(29) A leaf valve according to the above mode (28), wherein the at least one through-hole has a cross sectional area in a plane perpendicular to a direction of the thickness of the generally annular sheet member, which cross sectional area is determined so as to enable the at least one through-hole to function as a flow restrictor for restricting a flow of a working fluid therethrough, so that the generally annular sheet member is flexed due to a difference between pressures of the working fluid acting on opposite surfaces of the generally annular sheet member during an operation of the shock absorber.

The leaf valve according to the above mode (29) functions as a flow restricting leaf valve as used in the shock absorber according to the above mode (23).

(30) A leaf valve according to the above mode (28), wherein the at least one through-hole has a cross sectional area in a plane perpendicular to a direction of the thickness of the generally annular sheet member, which cross sectional area is determined so as not to enable the at least one through-hole to function as a flow restrictor for restricting a flow of a working fluid therethrough during an operation of the shock absorber.

The leaf valve according to the above mode (30) functions as a passage for permitting flows of the working fluid between two spaces which are partially defined by the opposite surfaces of the generally annular sheet member.

BRIEF DESCRIPTION OF THE DRAWINGS

The above and optional objects, features, advantages and technical and industrial significance of this invention will be better understood by reading the following detailed description of presently preferred embodiments of the invention, when considered in connection with the accompanying drawings, in which:

FIGS. 13A-1, 13A-2 and 13B are cross sectional views illustrating an operation of the soft valve of FIG. 11;

FIGS. 18A-1, 18A-2 and 18B are cross sectional views illustrating an operation of the soft valve of FIG. 16;

DETAILED DESCRIPTION OF THE PREFERRED EMBODIMENTS

Referring first to FIGS. 1–6, the shock absorber according to the first preferred embodiment of this invention will be described in detail.

Figure 1:
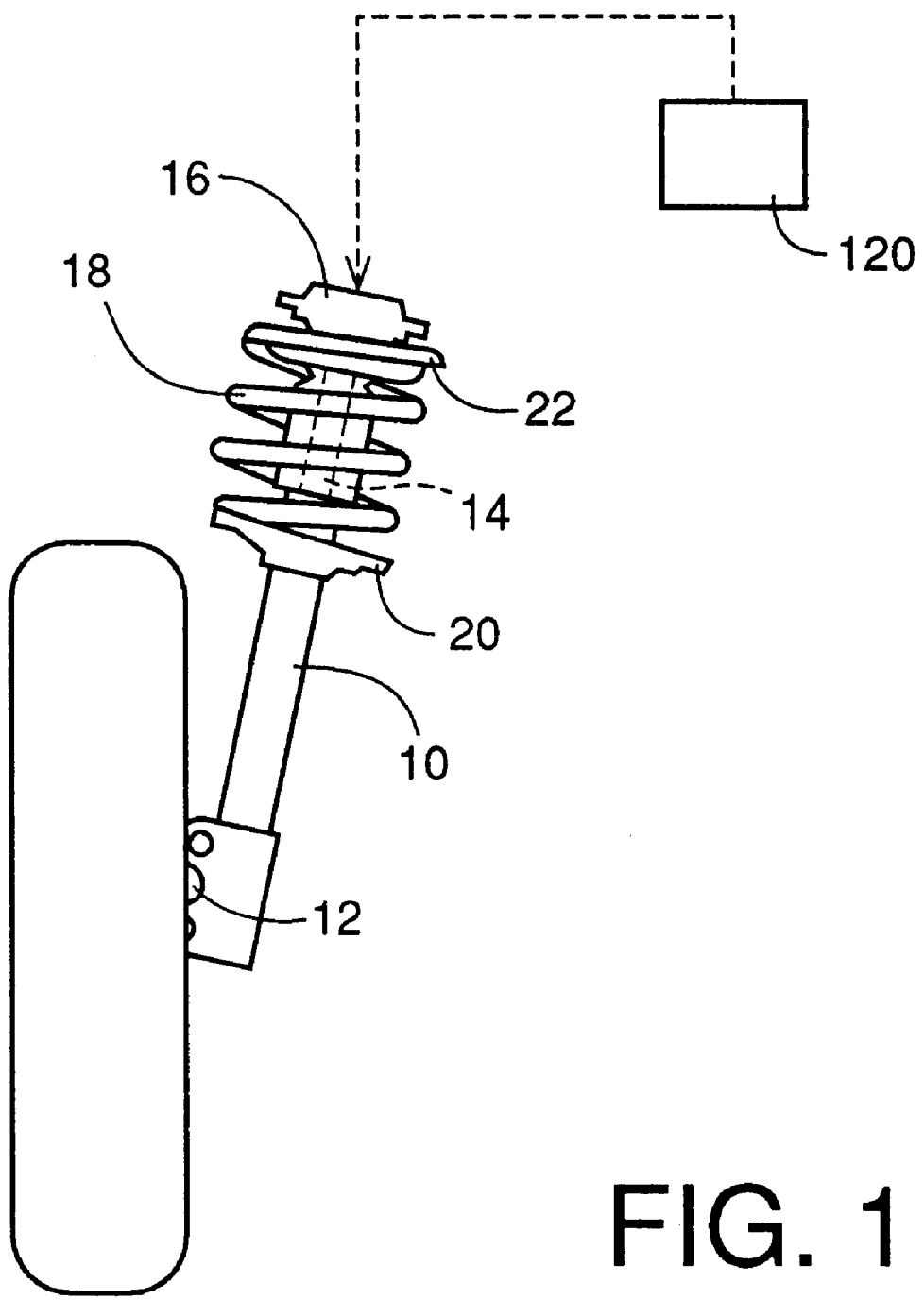
FIG. 1 is an elevational view of a shock absorber constructed according to one embodiment of this invention.

The shock absorber is one element of a suspension of a motor vehicle. As shown in FIG. 1, the shock absorber includes a cylinder body 10 attached through a bracket to a member 12 fixed to a wheel of the vehicle. The shock absorber further includes a piston rod 14 which is partly received within the cylinder body 10 and which is attached, at its end remote from the cylinder body 10, to a member 16 fixed to the body of the vehicle. A lower seat 20 is fixed to the cylinder body 10, while an upper seat 22 is fixed to the member 16. A spring 18 is interposed between these lower and upper seats 20, 22.

Figure 2:
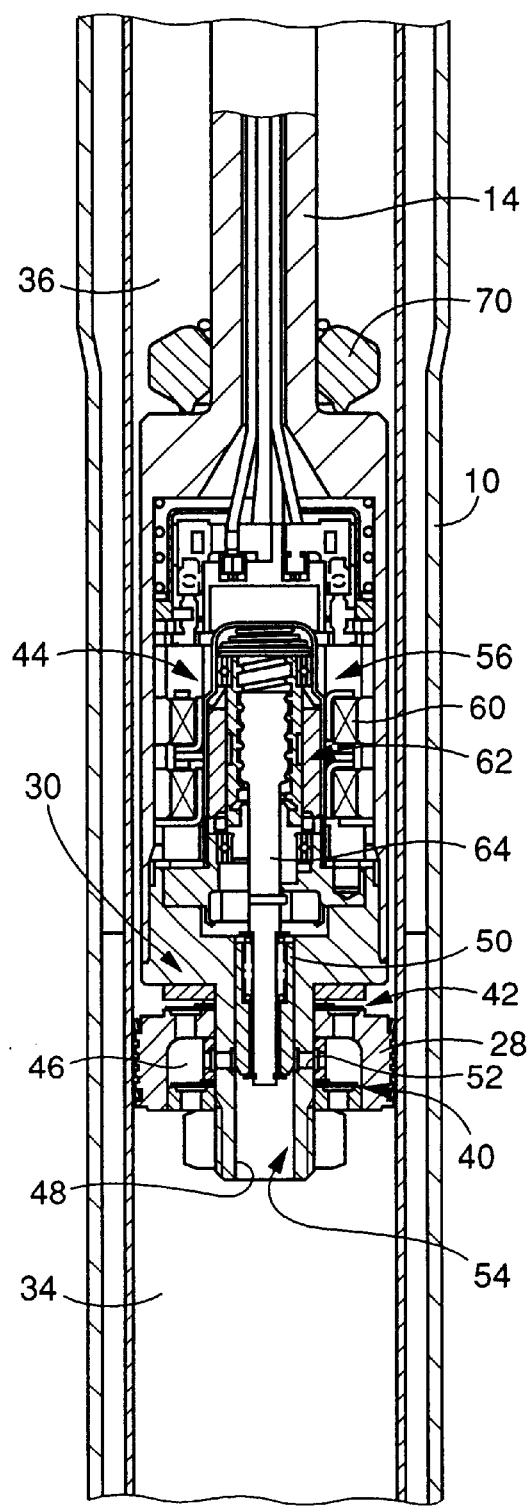
FIG. 2 is a fragmentary elevational view in cross section of a cylinder body of the shock absorber of FIG. 1.

As shown in FIG. 2, the shock absorber further includes a piston 28 and a damping force control device 30, which are received within the cylinder body 10. The piston rod 14 has a lower end portion extending through the piston 28. The piston 28 is fastened to the lower end portion of the piston rod 14, by a nut screwed on the externally threaded part of the lower end portion of the piston rod 14, so that the piston 28 and the piston rod 14 are movable as a unit. The piston 28 is fluid-tightly and slidably movable within the cylinder body 10, and cooperates with the cylinder body 10 to define a lower chamber 34 and an upper chamber 36 on the axially opposite sides of the piston 28. These lower and upper chambers 34, 36 are filled with a substantially non-compressible working fluid.

The damping force control device 30 includes a hard valve 40, a soft valve 42, and a variable flow restrictor device 44. The hard valve 40 and the soft valve 42 are disposed in the piston 28, such that the hard valve 32 is exposed to the lower chamber 34 while the soft valve 42 is exposed to the upper chamber 36. Between these two valves 40, 42, there is formed an intermediate fluid passage 46. The hard valve 40 and the soft valve 42 communicate with each other through the intermediate fluid passage 46, so that the hard and soft valves 40, 42 are formed in series connection with each other.

Figure 6:
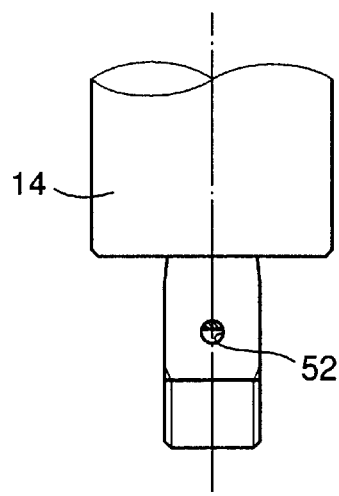
FIG. 6 is a front elevational view of a piston rod of the shock absorber of FIGS. 1–5.

The piston rod 14 has a through-hole 48 extending in its axial direction and open to the lower chamber 34. The piston rod 14 incorporates a spool 50 slidably movable within the through-hole 48. The piston rod 14 further has a plurality of radial holes 52 formed to extend in its radial direction, as shown in FIG. 6, so that the intermediate fluid passage 46 communicates with the through-hole 48 through the radial holes 52. The through-hole 48 and the radial holes 52 cooperate to define a hard-valve by-passing passage 54 for fluid communication between the lower chamber 34 and the intermediate fluid passage 46, while by-passing the hard valve 40. The cross sectional area of opening of each radial hole 52 with respect to the through-hole 48 changes depending upon the position of the lower end of the spool 50, that is, changes as the spool 50 is moved in its axial direction. Thus, the cross sectional area of fluid flow of the hard-valve by-passing passage 54 is controllable by the axial movement of the spool 50.

The variable flow restrictor device 44 includes the above-indicated spool 50, and a spool mover 56 for moving the spool 50 in the axial direction. The spool mover 56 includes an electric motor 60, a shaft 64, and a motion converting mechanism 62 for converting a rotary motion of the electric motor 60 into a linear motion of the shaft 64. That is, a rotary motion of the rotor of the electric motor 60 in operation is converted by the motion converting mechanism 60 into a linear motion of the shaft 64, so that the spool 50 is axially moved with the shaft 64.

In the present embodiment, the hard valve 40, the soft valve 42 and the hard-valve by-passing passage 54 are provided within the piston 28, while the variable flow restrictor device 44 for controlling the cross sectional area of fluid flow of the hard-valve by-passing passage 54 is incorporated in the piston rod 14.

The piston rod 14 has, at an axial portion thereof above the variable flow restrictor device 44, a rebound stop 70 fixed thereto for limiting the amount of its upward movement, which takes place when the shock absorber receives a vibrational load that causes elongation of the shock absorber, that is, elongation of the assembly of the cylinder body 10 and the piston rod 14 in the axial direction.

Figure 3:
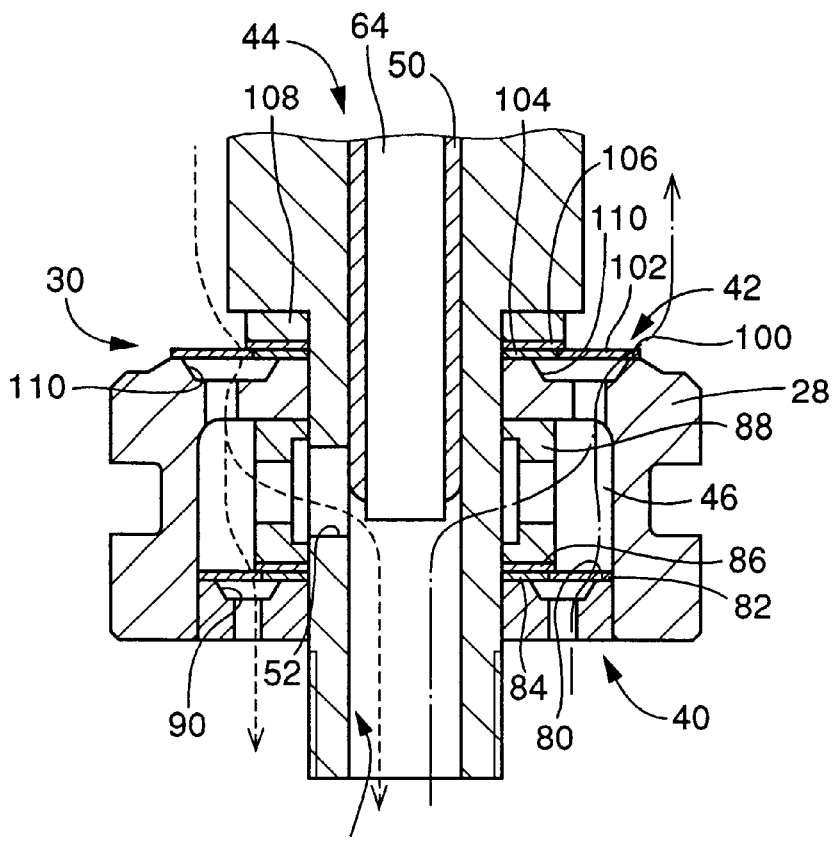
FIG. 3 is an elevational view in cross section of a part of the cylinder body of FIG. 2 which includes a piston.
Figure 4:
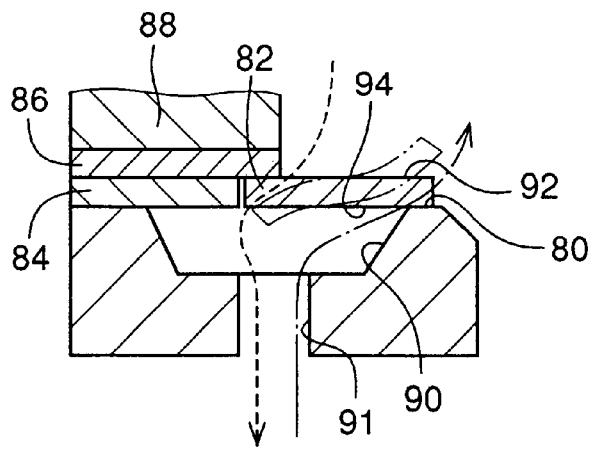
FIG. 4 is an elevational view in cross section showing a hard valve provided on the piston.
Figure 5:
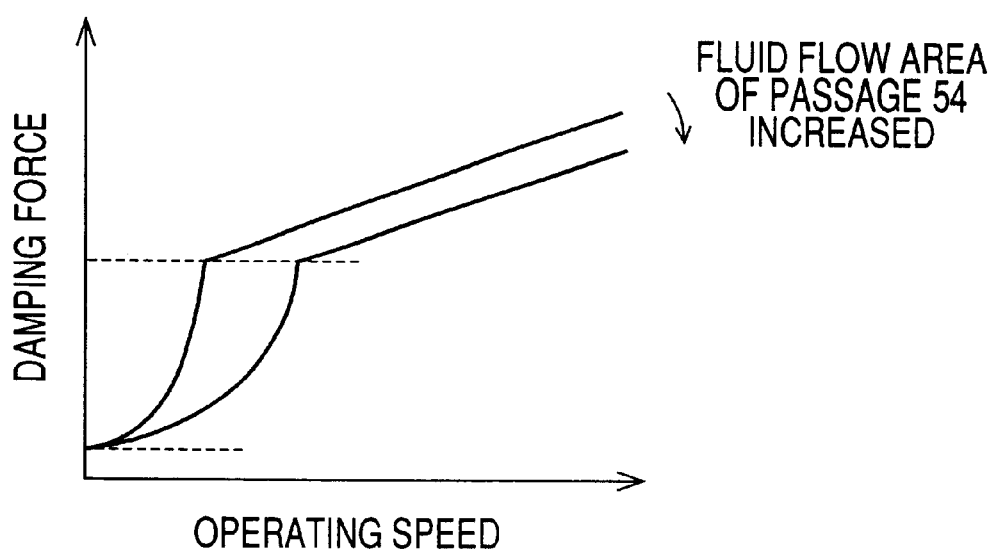
FIG. 5 is a graph indicating a damping characteristic of the shock absorber of FIGS. 1–4.

As shown in FIGS. 3 and 4, the hard valve 40 includes a first seat member in the form of an outer seat 80 provided in a relatively lower portion of the piston 28, a leaf valve 82 in the form of a ring-shaped or annular sheet, an annular positioning member 84 disposed radially inwardly of the leaf valve 82 to position the leaf valve 82 in the radial direction, and a second seat member in the form of an annular inner seat member 86 disposed on the positioning member 84 such that the radially outer portion of the inner seat member 86 is normally held in contact with an upper surface 92 of the radially inner portion of the leaf valve 82, as shown in FIG. 4. The upper surface 92 is exposed to the intermediate fluid passage 46. Between the piston 28 and the inner seat member 86, there is interposed a spacer 88 in contact with the piston 28 and inner seat member 86.

The piston 28 has an annular groove 90 formed adjacent to the outer seat 80 and a portion thereof on which the positioning member 84 rests. The piston 28 further has a plurality of axial fluid passages 91 communicating with the annular groove 90 and the lower chamber 34. The axial fluid passages 91 are spaced apart from each other in the circumferential direction of the piston 28. The outer seat 80 defines the outer periphery of the annular groove 90. As indicated above, the upper surface 92 of the leaf valve 82 is exposed to the intermediate fluid passage 46. On the other hand, a lower surface 94 of the leaf valve 82 is exposed to the lower chamber 34 through the annular groove 90 and the axial fluid passages 91. The leaf valve 82 is supported by the outer seat 80 and the inner seat member 86 such that the leaf valve 82 is elastically deformed by a force corresponding to a difference between the pressures of the working fluid in the intermediate fluid passage 46 and the lower chamber 34. A force acting on the radially outer portion of the leaf valve 82 in the downward direction is received by the outer seat 80, while a force acting on the radially inner portion of the leaf valve 82 in the upward direction is received by the piston 28 via the inner seat member 86 and the spacer 88. The hard valve 40 is opened with its leaf valve 82 being flexed, when the pressure difference between the intermediate fluid passage 46 and the lower chamber 34 exceeds a predetermined threshold, which will be referred to as "opening pressure difference" of the hard valve 40.

When the fluid pressure in the lower chamber 34 is higher than that in the intermediate fluid passage 46 by more than a predetermined amount corresponding to the above-indicated opening pressure difference, the leaf valve 82 is pressed at its radially inner periphery onto the inner seat member 86, and is flexed at its radially outer portion about the radially inner periphery. When the fluid pressure in the intermediate fluid passage 46 is higher than that in the lower chamber 34 by more than a predetermined amount corresponding to the above-indicated opening pressure difference, the leaf valve 82 is pressed at its radially outer periphery onto the outer seat 80, and is flexed at its radially inner portion about the outer seat 80.

The leaf valve 82 is less likely to be flexed at its radially inner portion than at its radially outer portion. Accordingly, the opening pressure difference of the hard valve 40 is higher at the radially inner portion than at the radially outer portion. In other words, the hard valve 40 is less likely to be opened when the piston rod 14 is moved upward, that is, when the assembly of the cylinder body 10 and the piston rod 14 is elongated with a relative movement of the cylinder body 10 and the piston rod 14 in the direction away from each other. Accordingly, the damping force generated by the present shock absorber is larger during elongation of the assembly, than during contraction of the assembly with a relative movement of the cylinder body 10 and the piston rod 14 in the direction toward each other.

The soft valve 42, which is similar in construction to the hard valve 40, includes a second seat member in the form of an outer seat 100, an annular leaf valve 102, an annular positioning member 104, and a first seat member in the form of an inner seat member 106. The inner seat member 106 is held in contact with the piston rod 14 via a spacer 108. The piston 28 has an annular groove 110. An annular portion of the piston 28 defining the outer peripheral edge of the annular groove 110 serves as the outer seat 100. The leaf valve 102 of the soft valve 42 has a larger outside diameter than the leaf valve 82 of the hard valve 40. The ratio of the outside diameter of the leaf valve 42 to its inside diameter is larger than that of the leaf valve 82, and the annular groove 110 has a larger outside diameter than the annular groove 90. Accordingly, the leaf valve 102 is more flexible than the leaf valve 82, that is, can be flexed with a smaller difference between the fluid pressures acting on its opposite surfaces. Thus, the soft valve 42 is more easily opened than the hard valve 40.

When the fluid pressure in the upper chamber 36 is higher than that in the intermediate fluid passage 46 by more than a predetermined amount of opening pressure difference, the leaf valve 102 is pressed at its radially outer periphery onto the outer seat 100, and is downwardly flexed at its radially inner portion about the outer seat 100. When the fluid pressure in the intermediate fluid passage 46 is higher than that in the upper chamber 36 by more than a predetermined amount of opening pressure difference, the leaf valve 102 is pressed at its radially inner periphery onto the inner seat member 106, and is upwardly flexed at its radially outer portion about the inner seat member 106.

The electric motor 60 indicated above is controlled by a control device 120, to control the axial position of the spool 50 relative to the piston rod 14, so that the cross sectional area of opening of the radial holes 52 with respect to the through-hole 48 is regulated, so as to control the cross sectional area of fluid flow of the hard-valve by-passing passage 54.

The operation of the shock absorber constructed as described above will be described.

When a vibrational load acts on the piston 28 in the upward direction, the piston rod 14 is moved away from the cylinder body 10, whereby the distance between the members 12, 16 is increased, namely, the assembly consisting of the cylinder body 10 and the piston rod 14 is elongated, so that the fluid pressure in the upper chamber 36 is raised, while the fluid pressure in the lower chamber 34 is lowered.

When the fluid pressure in the upper chamber 36 becomes higher than the fluid pressure in the intermediate fluid passage 46 by more than the predetermined opening pressure difference of the soft valve 42, this soft valve 42 is opened, whereby the working fluid is forced to flow from the upper chamber 36 into the lower chamber 34, through the opened soft valve 42, intermediate fluid passage 46 and hard-valve by-passing passage 54, as indicated by broken line in FIG. 3. At this time, the damping force generated by the shock absorber can be controlled by controlling the cross sectional area of fluid flow of the hard-valve by-passing passage 54.

When the fluid pressure in the intermediate fluid passage 46 becomes higher than the fluid pressure in the lower chamber 34 by more than the predetermined opening pressure difference of the hard valve 40, this hard valve 40 is opened, whereby a portion of the fluid is forced to flow from the intermediate fluid passage 46 into the lower chamber 34 through the hard valve 40, as also indicated by the broken line in FIG. 3.

The soft valve 42 is opened such that the radially inner portion of the leaf valve 102 is downwardly flexed about the outer seat 100. Similarly, the hard valve 40 is opened such that the radially inner portion of the leaf valve 82 is downwardly flexed about the outer seat 80. The ratio of the amount of flow of the fluid through the hard valve 40, to the amount of flow of the fluid through the hard-valve by-passing passage 54 is determined by the cross sectional area of fluid flow of the hard-valve by-passing passage 54. The damping force generated by the shock absorber can be controlled by changing the cross sectional area of fluid flow of the hard-valve by-passing passage 54, which causes a decrease in the resistance to the fluid flow through the passage 54.

When a vibrational load acts on the piston 28 in the downward direction, the piston rod 14 is moved toward the cylinder body 10, whereby the distance between the two members 12, 16 of the motor vehicle is reduced, namely, the shock absorber is contracted, namely, the assembly of the cylinder body 10 and the piston rod 14 is contracted, so that the fluid pressure in the lower chamber 34 is raised, while the fluid pressure in the upper chamber 36 is lowered. As a result, the working fluid is forced to flow from the lower chamber 34 into the upper, chamber 36, through the hard-valve by-passing passage 54 or hard valve 40, intermediate fluid passage 46 and soft valve 42, as indicated by one-dot chain lines in FIG. 3.

The soft valve 42 is opened such that the radially outer portion of the leaf valve 102 is upwardly flexed about the inner seat member 106. Similarly, the hard valve 40 is opened such that the radially outer portion of the leaf valve 82 is upwardly flexed about the inner seat member 86.

As described above, each of the leaf valves 82, 102 is less flexible at the radially inner portion than at the radially outer portion. Therefore, the resistance to the fluid flow through the hard and soft valves 40, 42 is higher when the assembly consisting of the cylinder body 10 and the piston rod 14 is elongated than when it is contracted, provided the velocity of the relative movement of the cylinder body 10 and the piston 28 (piston rod 14) is constant. Thus, the shock absorber generates a higher damping force when the assembly 10, 14 is elongated than when the assembly is contracted.

In the shock absorber according to the present embodiment, the hard valve 40 and the soft valve 42 permit the fluid flows therethrough during both the elongation and the contraction of the assembly 10, 14, that is, not only when the cylinder body 10 and the piston rod 14 are moved away from each other, but also when they are moved toward each other. In other words, the hard and soft valves 40, 42 are both bidirectionally operated, or flexed and thus opened in the opposite directions, depending upon whether the assembly consisting of the cylinder body 10 and the piston rod 14 is elongated or contracted. The hard and soft valves 40, 42 are disposed at the axially opposite portions of the piston 28, and the hard-valve by-passing passage 54 is formed through the inside of the piston 28. Accordingly, the piston 28 incorporating the two valves 40, 42 can be made comparatively simple in construction and small-sized.

Figure 7:
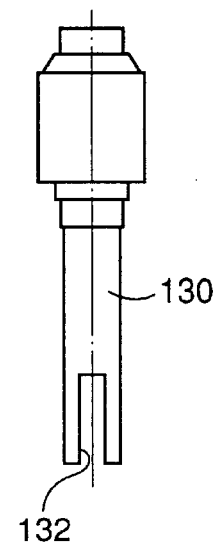
FIG. 7 is a front elevational view of a rotary valve used in a variable flow restrictor device of a shock absorber according to another embodiment of the present invention.

While the variable flow restrictor device 44 includes the spool 50, a rotary valve may be used in place of the spool 50, as in a second embodiment of FIG. 7 wherein the rotary valve indicated at 130 has a cutout 132 formed through its end portion so as to extend in the axial direction. The cross sectional area of opening of this cutout 132 with respect to the radial holes 52 can be changed as the rotary valve 130 is rotated about its axis by the electric motor 60, so that the cross sectional area of fluid flow of the hard-valve by-passing passage 54 can be controlled by controlling the angular position of the rotary valve 130. In this case, the shock absorber does not require the motion converting mechanism 62 for converting the rotary motion of the electric motor 60 into the linear motion of the shaft 64.

In the illustrated embodiment described above, the leaf valve 102 of the soft valve 42 has a larger diameter of the leaf valve 82 of the hard valve 40, so that the soft valve 42 is opened with a smaller-pressure difference of the lower and upper chambers 34, 36, than the hard valve 40. However, the leaf valve 102 of the soft valve 42 may have a smaller thickness or may be made of a more flexible material than the leaf valve 82 of the hard valve 40, in order to permit the soft valve 42 to be opened with a smaller pressure difference of the lower and upper chambers 34, 36.

Figure 8:
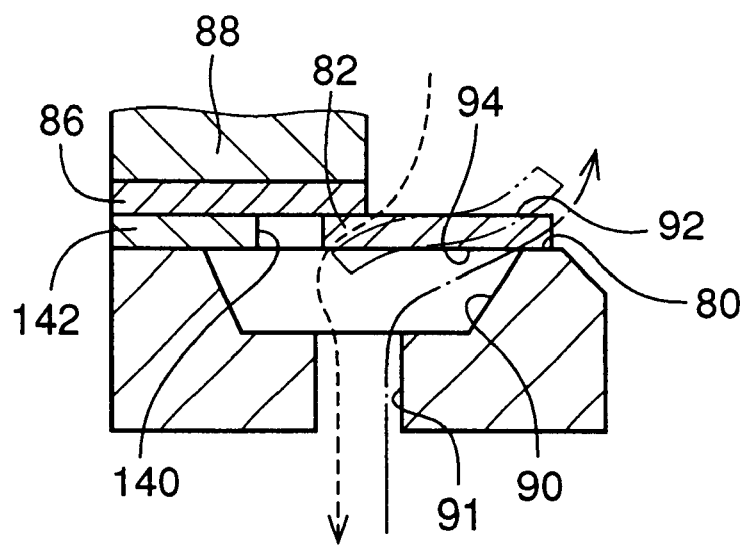
FIG. 8 is a fragmentary elevational view in cross section showing a hard valve of a shock absorber according to a further embodiment of the invention.

The positioning member 84 may be replaced by a positioning member 142 which has cutouts 142 formed through its thickness at its radially outer peripheral portion, as shown in FIG. 8. When the downward flexure of the leaf valve 82 is initiated, the cutouts 142 permit the fluid to flow therethrough even while the radially outer periphery of the leaf valve 82 is still located within the thickness of the positioning member 142. Accordingly, the hard valve 40 using the positioning member 142 permits the fluid flow therethrough with a small vibrational load acting on the shock absorber, than the hard valve 40 using the positioning member 84 which does not have cutouts.

The positioning member 142 may be used for only one of the hard and soft valves 40, 42 or both of these two valves 40, 42. Where the positioning member 142 is used for the soft valve 42, the elongation of the shock absorber is permitted even when the vibrational load acting on the shock absorber is comparatively small.

Figure 9:
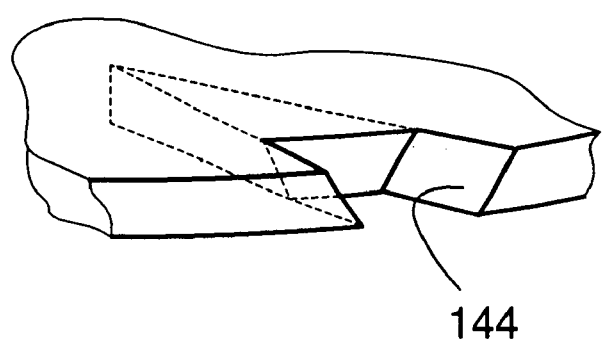
FIG. 9 is a perspective view of a positioning member used in a hard valve of a shock absorber according to a still further embodiment of this invention.
Figure 10:
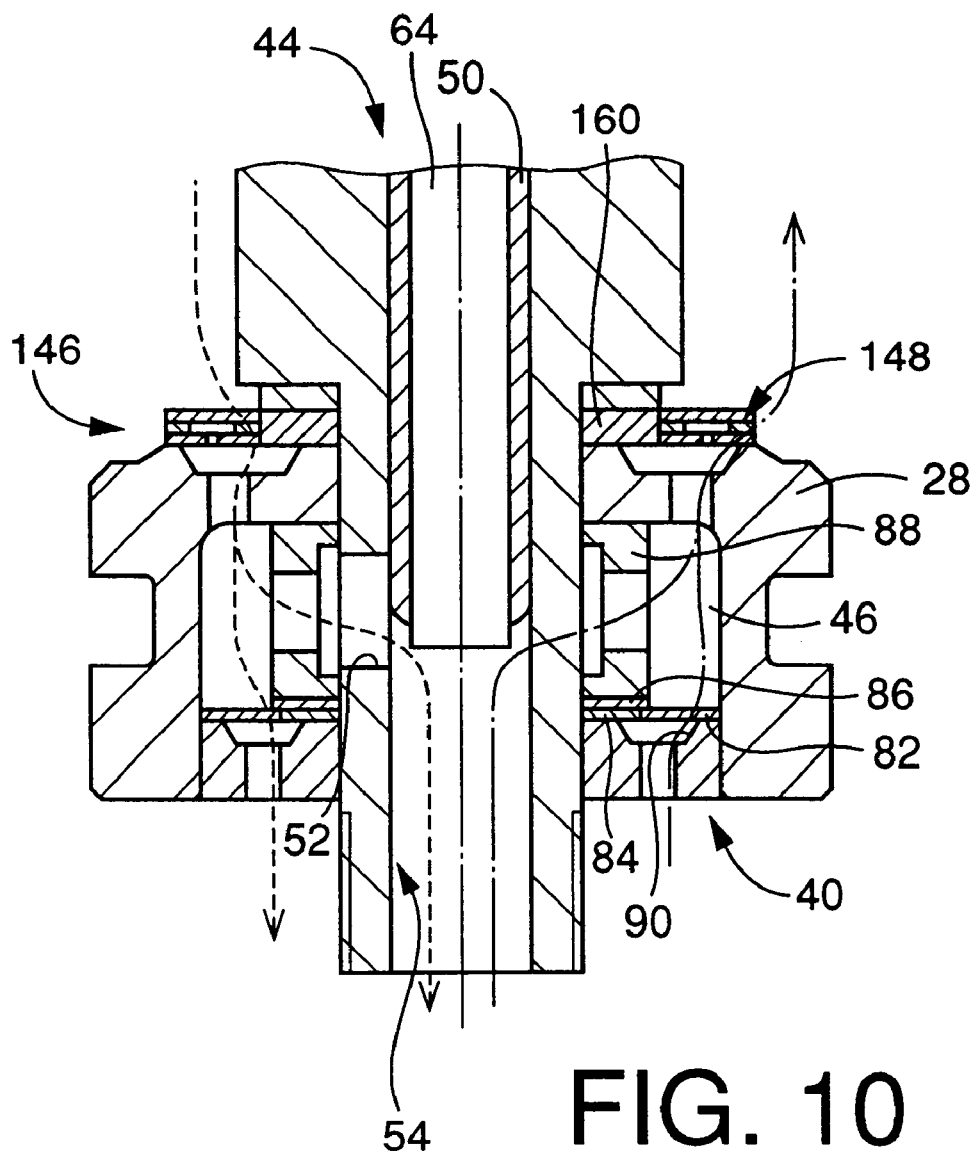
FIG. 10 is an elevational view in cross section, corresponding to that of FIG. 3, showing a part of a shock absorber according to a yet further embodiment of this invention.

While each of the cutouts 142 may have a constant cross sectional area in cross sectional plane of FIG. 8, the cutouts 142 may be replaced by cutouts 144 whose cross sectional area gradually or continuously decreases in the axial direction of the positioning member, as shown in FIG. 9. Where the cutouts have a cross sectional area small enough to provide a flow restricting function, the damping characteristic of the leaf valve can be changed by changing the cross sectional area. By changing the cross sectional area of the cutouts in the axial direction or the direction of fluid flow, the relationship between the amount of flexure of the leaf valve and the flow restricting effect of the cutouts can be changed.

It is also noted that the variable flow restrictor device 44 for changing the cross sectional area of fluid flow of the hard-valve by-passing passage 54 is not essential. That is, the hard-valve by-passing passage 54 may have or serves as a fixed flow restrictor. Further, a fluid passage having the variable flow restrictor device 44 or a fixed flow restrictor may be provided in parallel with the soft valve 42. It is further noted that the hard and soft valves 40, 42 need not be connected in series with each other. For example, the hard valve 40 may be provided in parallel with the series connection of the soft valve 42 and the hard-valve by-passing passage 54.

The hard valve 40 and the soft valve 42 may be disposed on the sides of the upper and lower chambers 36, 34, respectively. In this case, the shock absorber has a hard-valve by-passing passage communicating with the upper chamber 36 and the intermediate fluid passage 46.

While the shock absorber of FIG. 1 is adapted such that the piston rod 14 is fixed to the member 16 attached to the vehicle body while the cylinder body 10 is fixed to the member 12 attached to the wheel, the piston rod 14 and the cylinder body 10 may be fixed to the members 12, 16, respectively. In this case, the fluid pressure in the lower chamber is made higher than that in the upper chamber when the piston rod 14 is moved downward away from the cylinder body 10, while the fluid pressure in the upper chamber is made higher than that in the lower chamber when the piston rod is moved upward toward the cylinder body 10.

Referring next to FIGS. 10–13, there will be described a further embodiment of this invention which is identical with the first embodiment of FIGS. 1–6, except for a damping force control device 146 which includes a soft valve 148, as well as the hard valve 40 and the variable flow restrictor device 44 which have been described.

Figure 11:
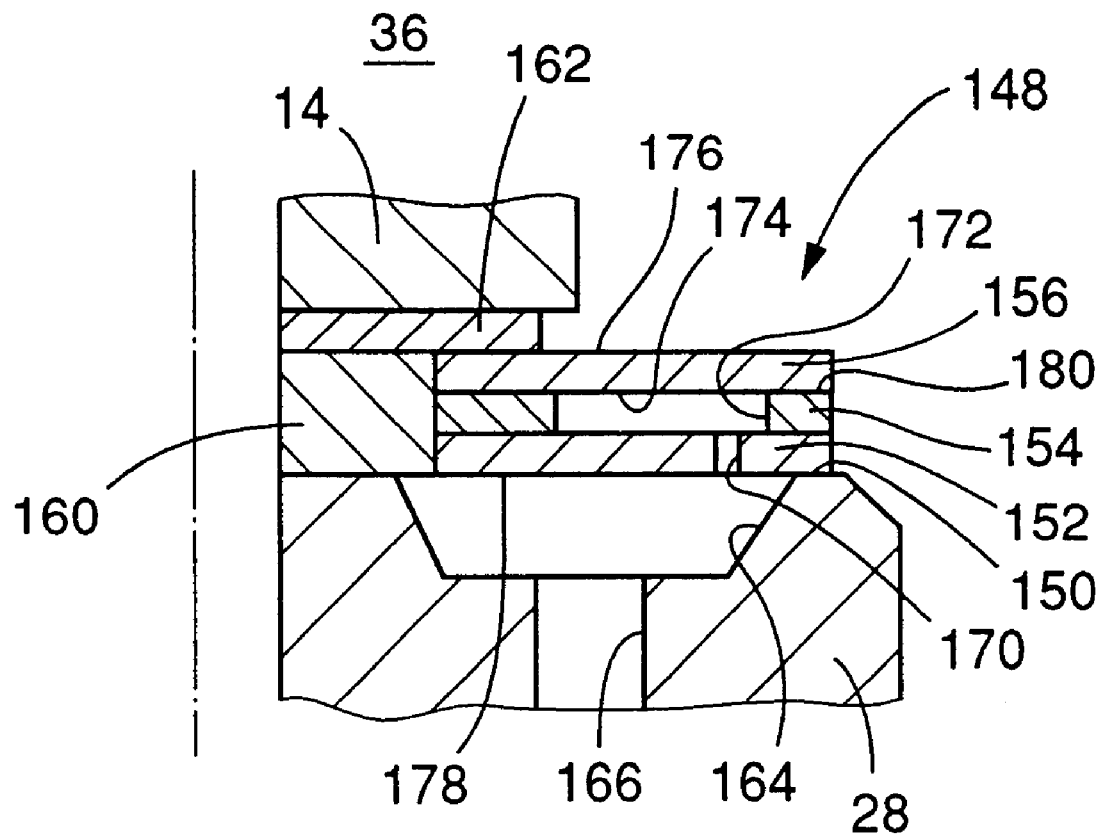
FIG. 11 is an elevational view in cross section of a soft valve provided in the shock absorber of FIG. 10.

The soft valve 148 includes a second seat member in the form of an outer seat 150 provided on the piston 28, three leaf valves 152, 154, 156 in the form of annular thin sheets, a positioning member 160, and a first seat member in the form of an inner seat member 162, as most clearly shown in FIG. 11. The inner seat member 162 is held in abutting contact with the piston rod 14, and adapted to receive a force which acts on the leaf valves 152, 154, 156 based on a difference between the fluid pressures in the upper chamber 36 and the intermediate fluid passage 46. The piston 28 has an annular groove 164 which communicates with the intermediate fluid passage 46 through a plurality of axial fluid passages 166. A portion of the piston 28 which defines the outer periphery of the annular groove 164 provides the outer seat 150.

Figure 12A:
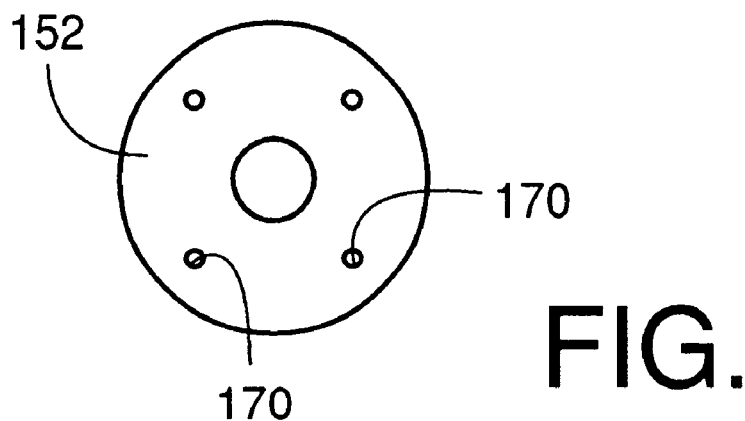
FIGS. 12A, 12B and 12C are plan views respectively showing three leaf valves used in the soft valve of FIG. 11.
Figure 12B:
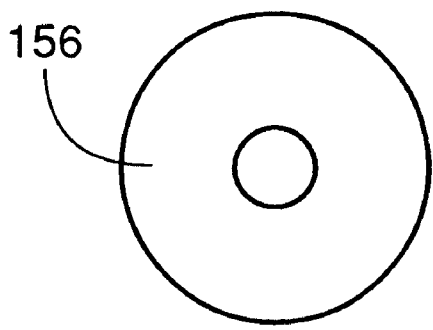
Figure 12C:
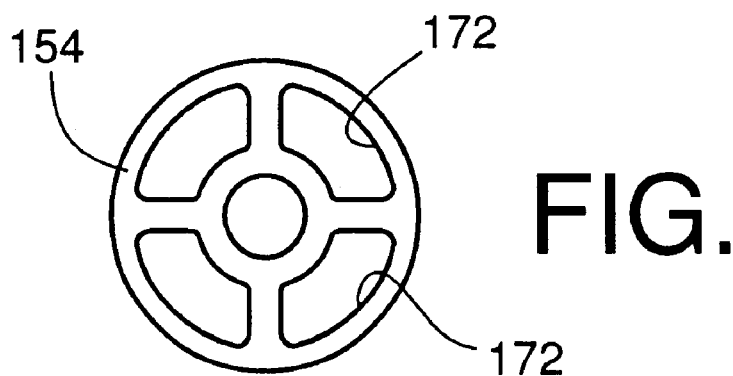

In the soft valve 148 in the present embodiment, the three leaf valves 152, 154, 156 are superposed on each other in the axial direction. The leaf valve 152 located nearest to the intermediate fluid passage 46 has four through-holes 170 formed through its thickness, each having a relatively small diameter, as shown in FIG. 12A. The through-holes 170 are arranged so as to lie on the same circle whose center is located at the center of the annular leaf valve 152. The leaf valve 156 located nearest to the upper chamber 36 has a comparatively small thickness and is comparatively easily flexed. This leaf valve 156 does not have any hole or opening, as shown in FIG. 12B. The intermediate leaf valve 154 has four through-holes 172 each having a considerably large size, as shown in FIG. 12C. The two leaf valves 152, 154 are positioned relative to each other such that the through-holes 170 communicate with the respective through-holes 172. The small through-holes 170 function as orifices, while the large through-holes 172 permit the leaf valve 156 to effective receive the fluid pressure in the intermediate fluid passage 46, at a surface 174 of the leaf valve 156 which is on the side of the intermediate fluid passage 46. Thus, the fluid pressure in the intermediate fluid passage 46 is transmitted to the leaf valve 156 through the small through-holes 170 and the large through-holes 172, which serve as a passage through which the surface 174 is exposed to the fluid pressure in the annular groove 164.

Figures 1, 13A:
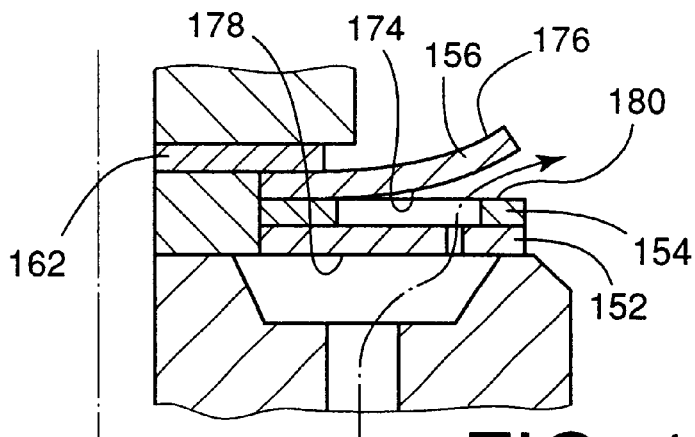
Figures 2, 13A:
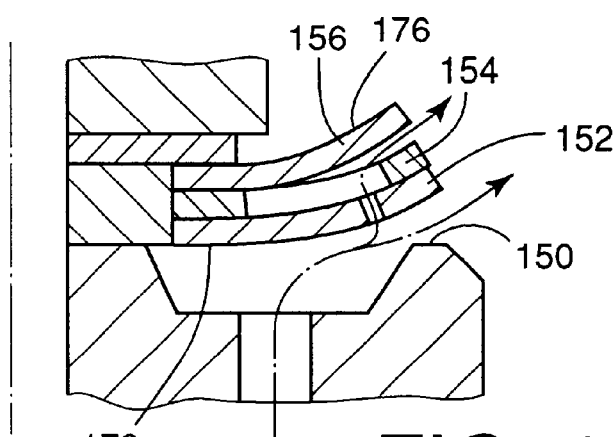

When the fluid pressure in the intermediate fluid passage 46 is higher than that in the upper chamber 36, the fluid pressure in the intermediate fluid passage 46 acts on the surface 174 of the leaf valve 156 through the through-holes 170, 172 (and through the axial fluid passages 166 and annular groove 164). At this time, the fluid pressure in the upper chamber 36 acts on a surface 176 of the leaf valve 156 which is on the side of the upper chamber 36. When the fluid pressure in the intermediate fluid passage 46 becomes higher than that in the upper chamber 36 by more than a predetermined amount of opening pressure difference, namely, when the fluid pressure acting on the surface 174 becomes higher than the fluid pressure acting on the surface 176 by an amount enough to cause flexure of the leaf valve 156, the leaf valve 156 is pressed at its radially inner periphery against the inner seat member 162, and is upwardly flexed at its radially outer portion, as shown in FIG. 13A-1. The working fluid is forced to flow from the intermediate fluid passage 45 into the upper chamber 36 through the small through-holes 170, the large through-holes 172 and a gap between the leaf valves 154, 156, as indicated by one-dot chain line in FIG. 13A-1. Since the leaf valve 156 is comparatively likely to be flexed, the leaf valve 156 is upwardly flexed so as to permit the fluid flow into the upper chamber 36, even when the difference between the fluid pressures in the intermediate fluid passage 46 and upper chamber 36 is relatively small. In this instance, the shock absorber generates a damping force based on the damping characteristic of the orifice in the form of the small through-holes 170.

As the fluid pressure difference between the intermediate fluid passage 45 and the upper chamber 36 thereafter increases, the fluid flow through the soft valve 148 is restricted by the small through-holes 170, so that the rate of flow of the fluid through the through-holes 170 is limited. As a result, the fluid pressure in the intermediate fluid passage 46 is more likely to act on a surface 178 of the leaf valve 152 on the side of the intermediate fluid passage 46, while the pressure in the upper chamber 36 acts on a surface 180 of the leaf valve 154 on the side of the upper chamber 36. When the fluid pressure acting on the surface 178 of the leaf valve 152 becomes higher than the fluid pressure acting on the surface 180 of the leaf valve 154 by an amount enough o cause flexure of the leaf valves 152, 154, these leaf valves 152, 154 are both upwardly flexed at their radially outer portions, as shown in FIG. 13A-2, so that the fluid is permitted to flow also through a gap between the leaf valve 152 and the outer seat 150. In this case, the shock absorber generates a damping force based on the damping characteristic of the soft valve 148. As shown in FIGS. 13A01 and FIG. 13A-2, the fluid is permitted to flow, partly through the through-holes 170, 172 and the gap between the leaf valves 154, 156, and partly through the gap between the leaf valve 152 and the outer seat 150.

Where the fluid pressure in the intermediate fluid passage 46 is higher than that in the upper chamber 36, only the leaf valve 156 is flexed when the difference between the fluid pressure in the passage 46 and the upper chamber 36 is relatively small, and the leaf valves 154, 152 as well as the leaf valve 156 are flexed when the difference is relatively large. Thus, the number of the leaf valves 152, 154, 156 to be flexed concurrently during operation of the soft valve 148 changes depending upon whether the fluid pressure difference is larger than a predetermined threshold or not. In other words, the soft valve 148 exhibits different damping characteristics depending upon the operating state of the shock absorber. Since the leaf valve 156 is considerably flexible, the soft valve 148 permits the fluid flow therethrough so as to provide a controlled damping force, even when the fluid pressure difference is considerably small, with a considerably low velocity of the relative movement of the cylinder body 10 and the piston rod 14, namely, with a considerably low operating speed of the shock absorber.

Figure 13B:
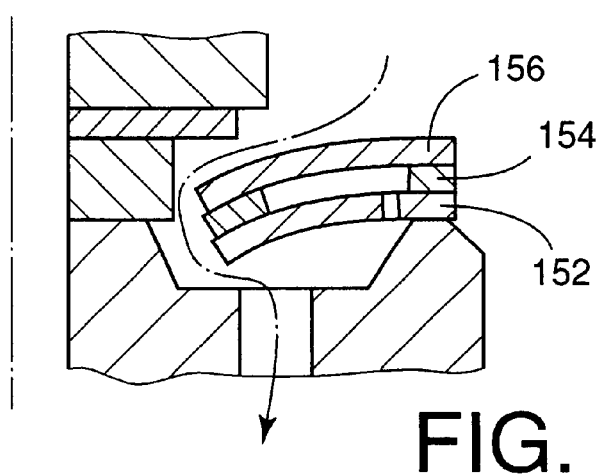

When the fluid pressure in the upper chamber 36 becomes higher than the fluid pressure in the intermediate fluid passage 46 by more than a predetermined amount of opening pressure difference, that is, by an mount enough to cause flexure of the leaf valves 152, 154, 156, the leaf valves 152, 154, 156 are pressed at their radially outer peripheries against the outer seat 150 and are downwardly flexed at their radially inner portions, as shown in FIG. 13B. In this case where the three leaf valves 152, 154, 156 are all flexed, there arises a relatively large resistance to the fluid flow through the soft valve 148, and the shock absorber exhibits a damping force based on the damping characteristic of the soft valve 148.

Figure 14:
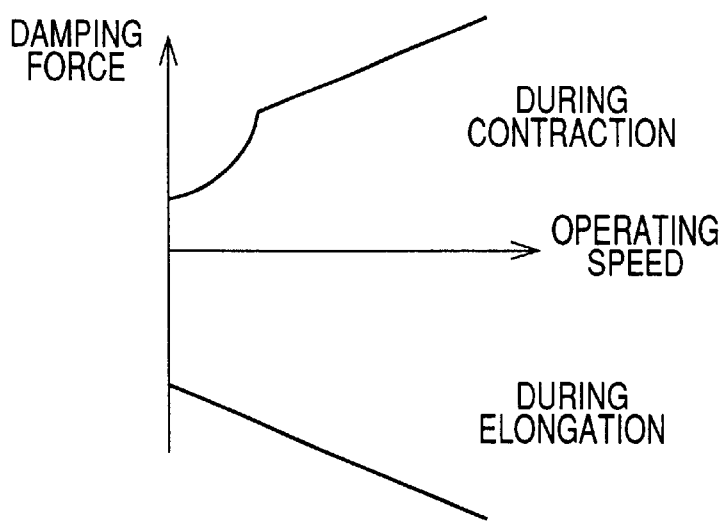
FIG. 14 is a graph indicating a damping characteristic of the soft valve of FIG. 11.

As shown in the graph of FIG. 14, the soft valve 148 generates a damping force based on the damping characteristic of the through-holes 170 serving as the orifice, when the fluid pressure in the intermediate fluid passage 46 is higher than that in the upper chamber 36 (namely, when the shock absorber is contracted), and when the pressure difference is relatively small (namely, when the operating speed of the shock absorber is relatively low). When the pressure difference is relatively large, the soft valve 148 generates a damping force based on its operating characteristic. When the fluid pressure in the upper chamber 36 is higher than that in the intermediate fluid passage 46 (namely, when the shock absorber is elongated), the leaf valves 152, 154, 156 are all flexed, so that the soft valve 148 generates a larger damping force than when only one leaf valve is flexed. In this case where the shock absorber is elongated, the opening pressure difference of the soft valve 148 and the damping coefficient are both relatively large.

In the shock absorber constructed as described above, the soft valve 148 is kept closed to inhibit the fluid flow therethrough from the high-pressure chamber to the low-pressure chamber while the vibrational load acting on the shock absorber is relatively small. When the soft valve 148 is opened as a result of an increase in the load acting on the shock absorber, the fluid is forced to flow through the soft valve 148, intermediate fluid passage 46 and hard-valve by-passing passage 54. With a further increase in the load acting on the shock absorber, the hard valve 40 is opened, so that a portion of the fluid is forced to flow through the soft valve 148, intermediate fluid passage 46 and hard valve 40.

When a vibrational load acts on the piston 28 in the downward direction, the piston rod 14 is moved toward the cylinder body 10, whereby the distance between the members 12, 16 is reduced, namely, the assembly consisting of the cylinder body 10 and the piston rod 14 is contracted. When the load acting on the shock absorber is relatively. small in this case, the hard valve 40 is not opened, but only the leaf valve 156 of the soft valve 148 is flexed, permitting the fluid to flow through the soft valve 148. With the soft valve 148 being opened, the fluid is forced to flow through the hard-valve by-passing passage 54, intermediate fluid passage 46 and soft valve 148. When the load acting on the shock absorber is increased, the leaf valves 152, 154 are also flexed with a further increase in the load, the leaf valve 82 of the hard valve 40 is flexed, permitting the fluid to flow through the hard valve 40. In this case, a portion of the fluid through the hard valve.40, intermediate fluid passage 46 and soft valve 148.

When a vibrational load acts on the piston 28 in the upward direction, the piston rod 14 is moved away from the cylinder body 10, whereby the distance between the members 12, 16 is increased, namely, the assembly consisting of the cylinder body 10 and the piston rod 14 is elongated. During the elongation, the leaf valves 152, 154, 156 of the soft valve 148 are flexed to permit the fluid to flow through the soft valve 148, while the leaf valve 82 of the hard valve 40 is flexed to permit the fluid flow.

Figure 15:
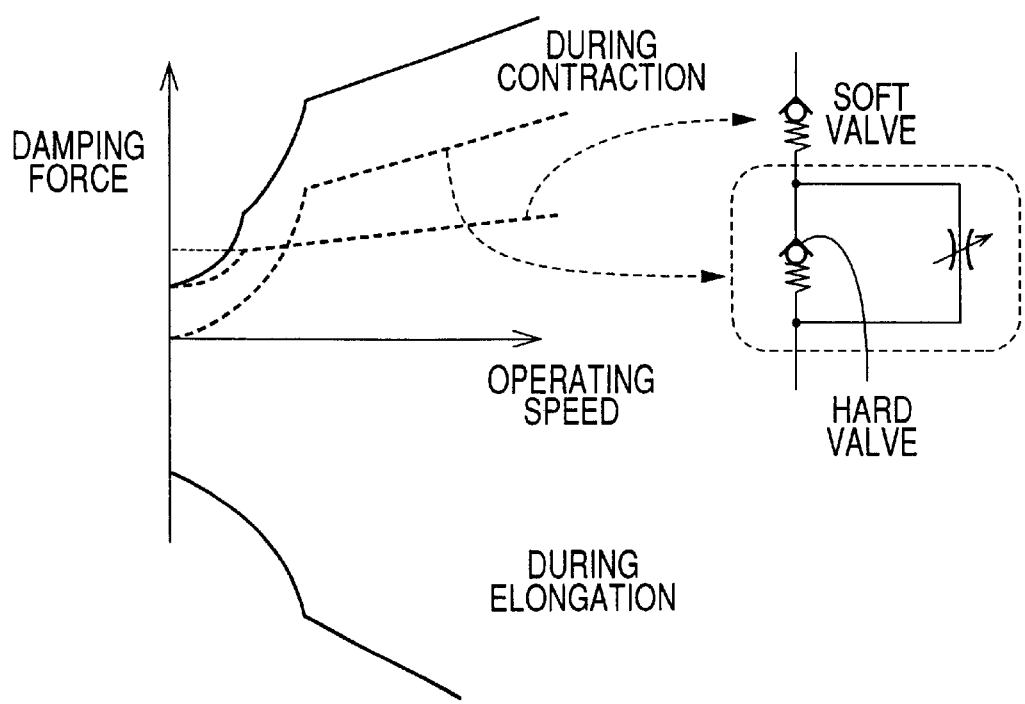
FIG. 15 is a view indicating a damping characteristic of the shock absorber of FIG. 10.

In the present shock absorber, the damping force changes in relation to the operating speed (i.e., pressure difference), as indicated in the graph of FIG. 15. During the elongation of the shock absorber, the three leaf valves 152, 154, 156 of the soft valves 148 are flexed, so that the opening pressure difference of the soft valve 148 and the damping coefficient are larger than during the contraction of the shock absorber. During the contraction, the leaf valve 156 is flexed to permit the fluid flow, when the load acting on the shock absorber is relatively small and when the pressure difference between the intermediate fluid passage 46 and the upper chamber 36 is relatively small.

Thus, the number of the leaf valves 152, 154, 156 of the soft valve 148 that are flexed concurrently changes depending upon whether the shock absorber (assembly 10, 14) is elongated or contracted, and whether the fluid pressure difference is relatively large or small. Accordingly, the freedom of design of the shock absorber can be increased in relation to the damping characteristics.

Figure 16:
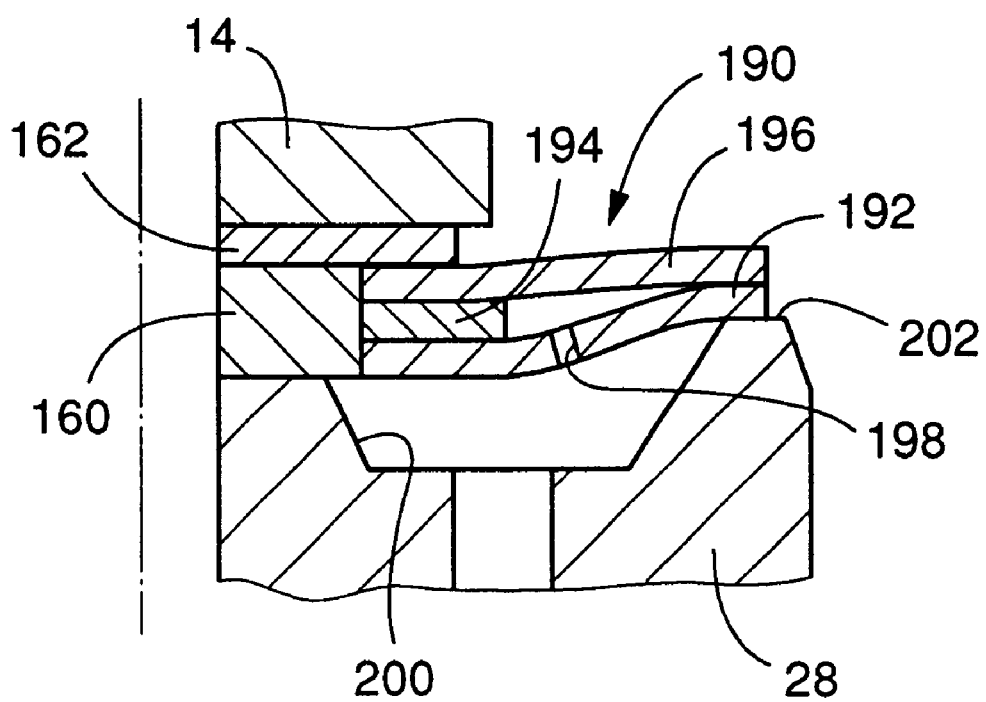
FIG. 16 is a fragmentary elevational view of a soft valve used in a shock absorber according to another embodiment of the present invention.
Figure 17A:
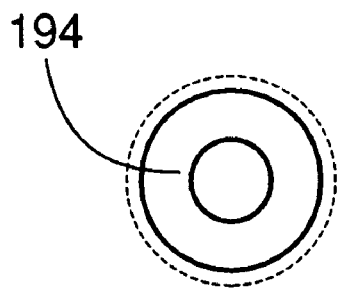
FIGS. 17A, 17B and 17C are plan views respectively showing three leaf valves used in the soft valve of FIG. 16.
Figure 17B:
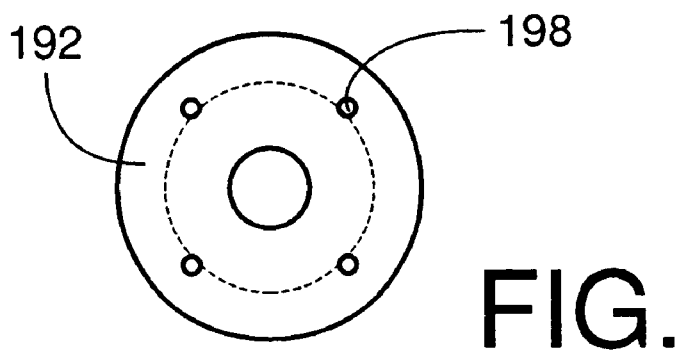
Figure 17C:
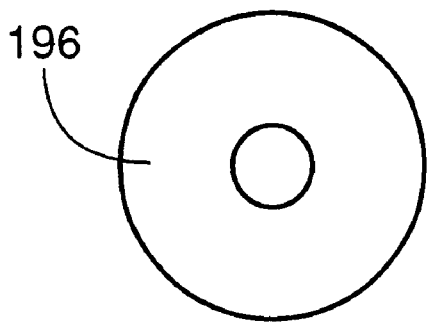
Figures 1, 18A:
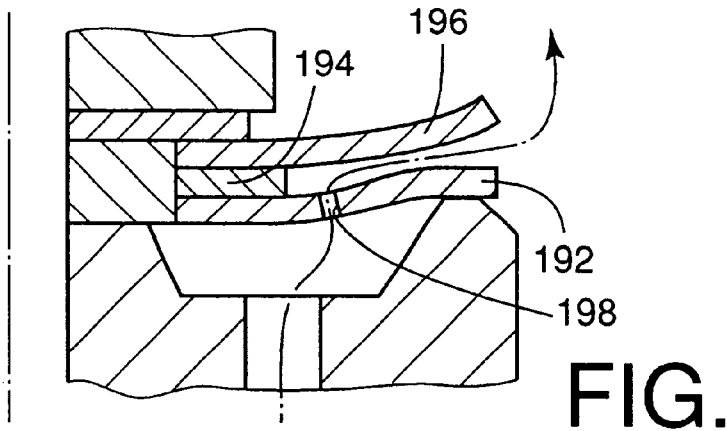
Figures 2, 18A:
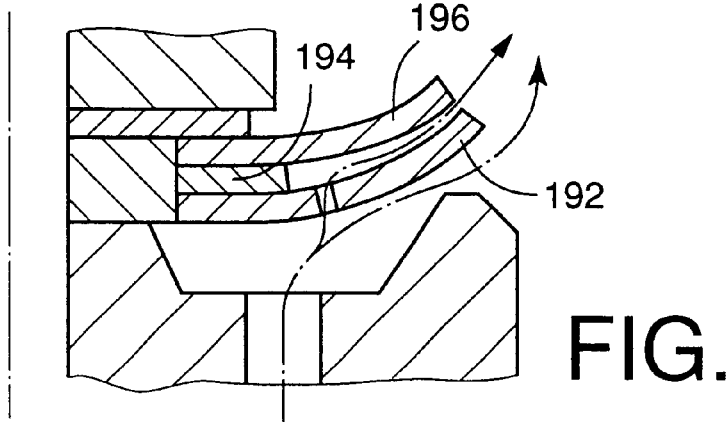

A further embodiment of the present invention shown in FIGS. 16–18 uses a soft valve 190. Like the soft valve 148 of FIG. 11, the soft valve 190 includes three annular leaf valves 192, 194, 196 as shown in FIGS. 16 and 17. The intermediate leaf valve 194 shown in FIG. 17A has an outside diameter which is determined not to close small through-holes 198 formed through the leaf valve 192 shown in FIG. 17B. The through-holes 198 each having a small diameter are arranged so as to lie on the same circle concentric with the annular leaf valve 192. The outside diameter of the leaf valve 194 is smaller than the diameter of this circle. As in the preceding embodiment, the piston 28 has an annular groove 200, and a portion of the piston 28 defining the outer periphery of the groove 200 provides an outer seat 202. As is apparent from FIG. 16, the outer seat 202 (outer periphery of the annular groove 200) is spaced from the inner periphery of the annular groove 200 by a given distance in the axial direction on the side of the upper chamber 36, that is, in the upward direction, so that the leaf valve 192 is elastically flexed or bent in the upward direction at its radially outer portion, with the outer peripheral portion being pressed against the outer seat 202 by the elasticity of the leaf valve 192, in close abutting contact with the outer seat 202. Since the outside diameter of the intermediate leaf valve 194 is smaller than that of the leaf valve 192, 196, the leaf valves 192, 196 are in abutting contact with each other at their outer peripheral portions so as to inhibit the fluid flow therebetween, when the shock absorber is in a non-operated state without a vibrational load acting thereon.

When the fluid pressure in the intermediate fluid passage 46 is higher than that in the upper chamber 36, the fluid pressure in the intermediate fluid passage 46 acts on the surface of the leaf valve 196 on the side of the passage 46, through the through-holes 198 and a gap between the leaf valves 192, 194. At this time, the fluid pressure in the upper chamber 36 acts on the surface of the leaf valve 196 which is exposed to the upper chamber 36. When the difference of the fluid pressures acting on those opposite surfaces of the leaf valve 196 becomes larger than a predetermined opening pressure difference, the leaf valve 196 is upwardly flexed at its radially outer portion, as shown in FIG. 18A-1, so that the soft valve 190 generates a damping force based on the characteristic of the orifice in the form of the through-holes 198. When the difference of the fluid pressures acting on the opposite surfaces of the leaf valve 192 becomes larger than a value that causes flexure of the leaf valves 192, 194, these leaf valves 192, 194 are upwardly flexed at their radially outer portions, as shown in FIG. 18A-2, so that the soft valve 190 generates a damping force based on its damping characteristic.

Figure 18B:
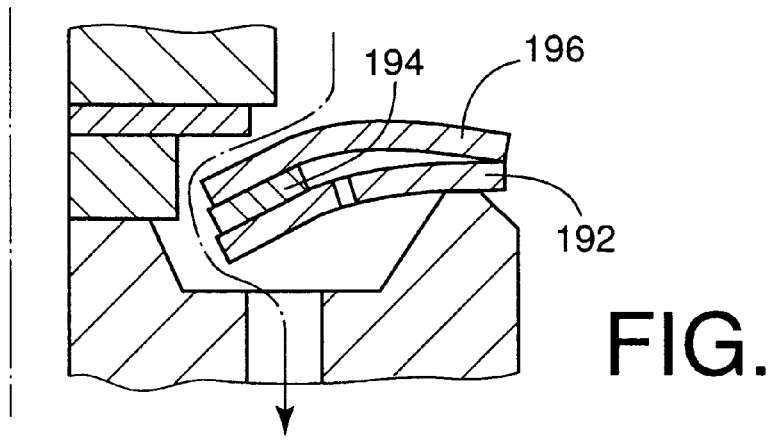

When the fluid pressure in the upper chamber 36 becomes higher than that in the intermediate fluid passage 46 by more than a predetermined opening pressure difference that causes flexure of the leaf valves 192, 194, 196, these leaf valves 192, 194, 196 are downwardly flexed at their radially inner portions, as shown in FIG. 18B. During this elongation of the shock absorber, the opening pressure difference of the soft valve 190 and the damping coefficient are larger than during the contraction, since the three leaf valves 192, 194, 196 are required to be flexed for the soft valve 190 to be opened.

Figure 19A:
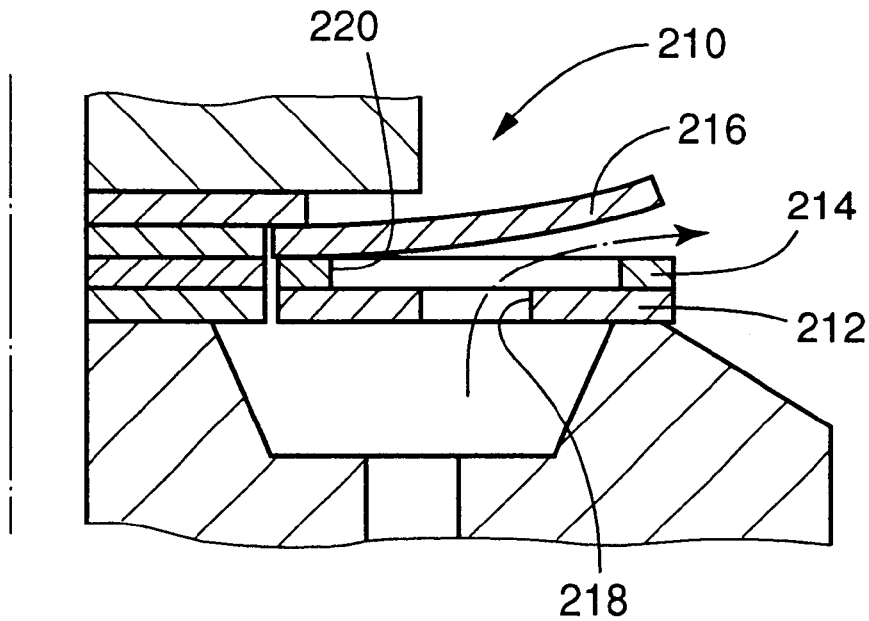
FIGS. 19A and 19B are fragmentary cross sectional views illustrating an operation of a soft valve of a shock absorber according to still another embodiment of this invention.
Figure 19B:
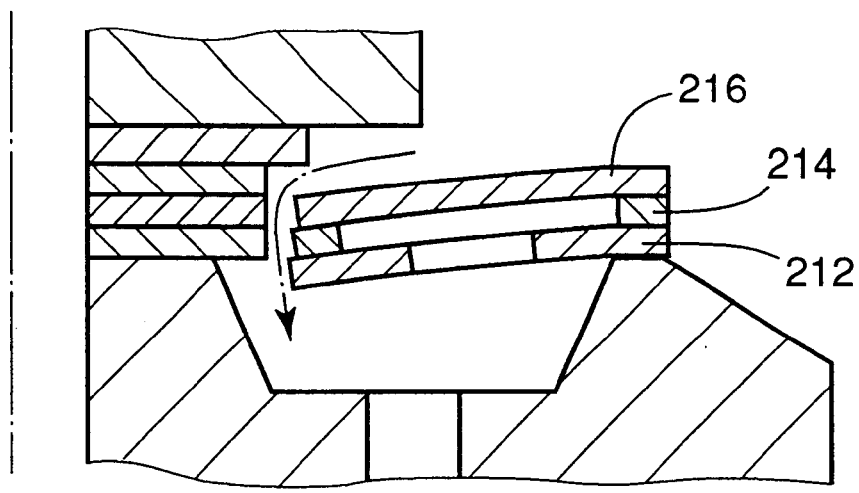

Referring to FIGS. 19A and 19B, there will be described a yet further embodiment of this invention, which uses a soft valve 210 including three annular leaf valves 212, 214, 216. The leaf valve 212 nearest to the intermediate fluid passage 46 has relatively large through-holes 218 which do not function as an orifice and does not has a flow restricting effect. The intermediate leaf valve 214 has large through-holes 220. When only the leaf valve 216 is flexed, as indicated in FIG. 19A, the fluid is forced to flow through the through-holes 218, 220, and the damping force generated is not based on the characteristic of an orifice, but is based on the characteristic of the soft valve 210. Since the size of each through-holes 218 is large enough to permit a high rate of flow of the fluid therethrough, all of the three leaf valves 212, 214, 216 are not flexed concurrently, but only the leaf valve 216 is flexed, when the fluid pressure difference is considerably large.

As described above, only the leaf valve 216 is upwardly flexed as shown in FIG. 19A during the contraction of the shock absorber. During the elongation of the shock absorber, the three leaf valves 212, 214, 216 are downwardly flexed as shown in FIG. 19B.

Similar effect may be obtained where the outside diameter of the leaf valve 214 is smaller than the diameter of the circle on which the through-holes 218 of the leaf valve 212 lie. While the leaf valves 212, 214, 216 are positioned by respective positioning members, as shown in FIGS. 19A and 19B, a single positioning member may be provided for the three leaf valves 212, 214, 216, as in the preceding embodiment of FIGS. 16–18.

Figure 20:
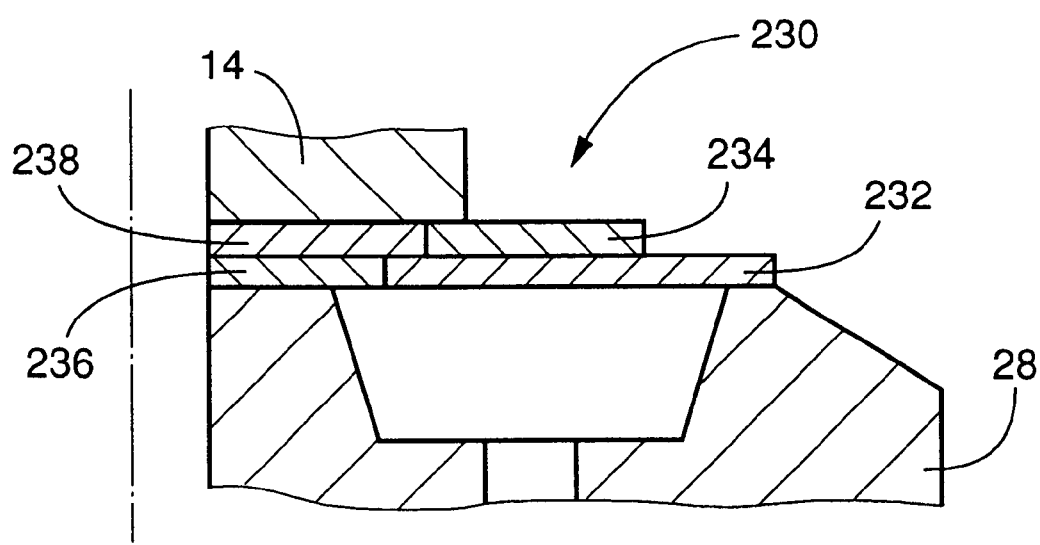
FIG. 20 is a fragmentary cross sectional view of a soft valve used in a shock absorber according to yet another embodiment of this invention.

A yet further embodiment of the present invention will be described by reference to FIGS. 20 and 21. The shock absorber according to this embodiment uses a soft valve 230 which includes two leaf valves 232, 234 whose inside diameters are almost equal to each other and whose outside diameters are different from each other. The leaf valve 234 is superposed on a portion of the leaf valve 232 the soft valve 230 further includes two positioning members 236, 238 for positioning the respective leaf valves 232, 234. The positioning member 238 for the leaf valve 234 also serves as an inner seat member for the leaf valve 232, while a portion of the piston rod 14 contacting the positioning member 238 serves as an inner seat member for the leaf valve 234.

Figure 21A:
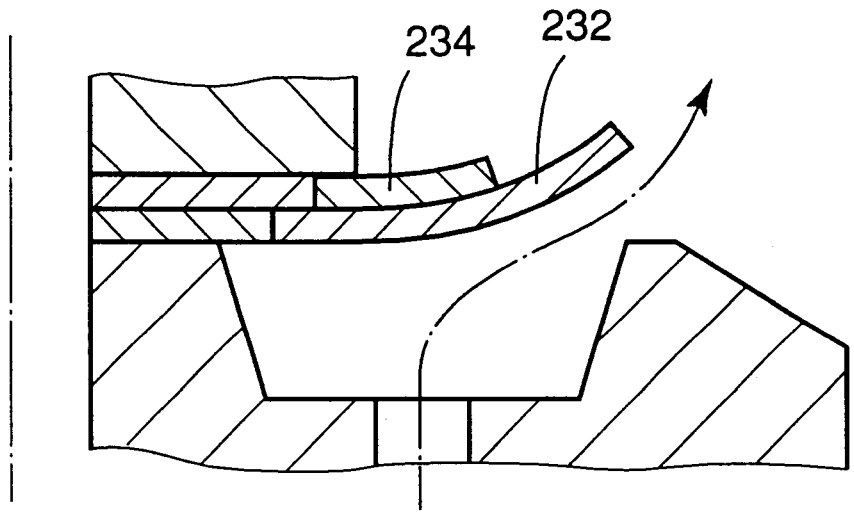
FIGS. 21A and 21B are cross sectional views illustrating an operation of the soft valve of FIG. 20.
Figure 21B:
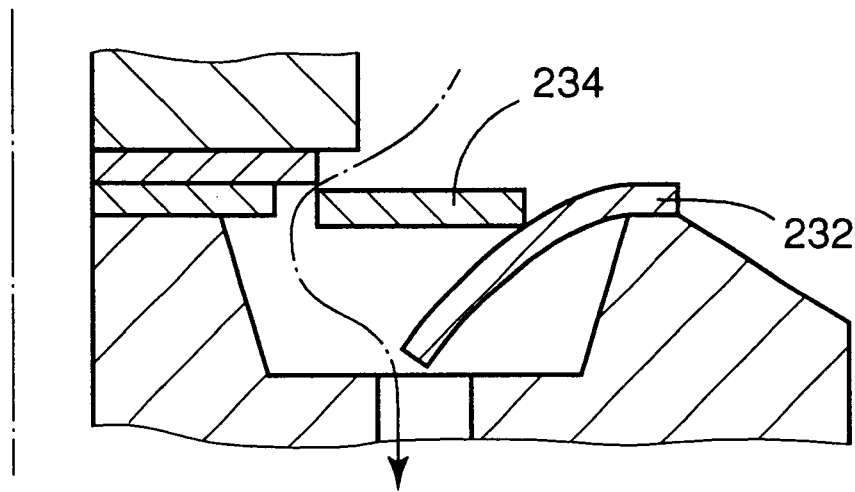

During contraction of the shock absorber with the piston rod 14 moved toward the cylinder body 10, the leaf valves 232, 234 are both flexed, as shown in FIG. 21A. During elongation of the shock absorber with the piston rod 14 moved away from the cylinder body 10, only the leaf valve 232 is flexed with substantially no flexure of the leaf valve 234, as shown in FIG. 21B. Thus, the number of the leaf valves to be flexed concurrently during operation of the soft valve 230 changes depending upon whether the shock absorber is contracted or elongated. During the elongation, the fluid is present between the leaf valves 232, 234, causing a difference between the fluid pressures acting on the opposite surfaces of the leaf valve 232, which causes flexure of only the leaf valve 232.

The positioning members 236, 238 may have one or more cutouts at their radially outer peripheral portions. These cutouts permit the fluid to flow through the soft valve 230 at a sufficiently high rate, even in an initial period of opening of the soft valve 230.

Figure 22:
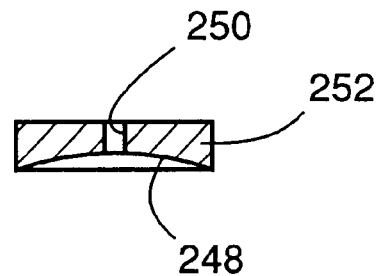
FIG. 22 is a cross sectional view of a leaf valve used in a soft valve of a shock absorber according to a further embodiment of the invention.

The leaf valve 234 may be replaced by a leaf valve 252 having a pressure transmitting portion 248 and a plurality of through-holes 250, as shown in FIG. 22. In this case, the fluid pressure in the upper chamber 36 can be effective applied to the surface of the leaf valve 232 on the side of the upper chamber 36, through the through-holes 240 and the pressure transmitting portion 248. When the fluid pressure acting on the surface of the leaf valve 232 on the side of the upper chamber 36 becomes higher than the fluid pressure acting on the opposite surface of the leaf valve 232 by more than a predetermined opening pressure difference, only the leaf valve 232 is downwardly flexed while the leaf valve 252 remains in the non-flexed state.

Figure 23:
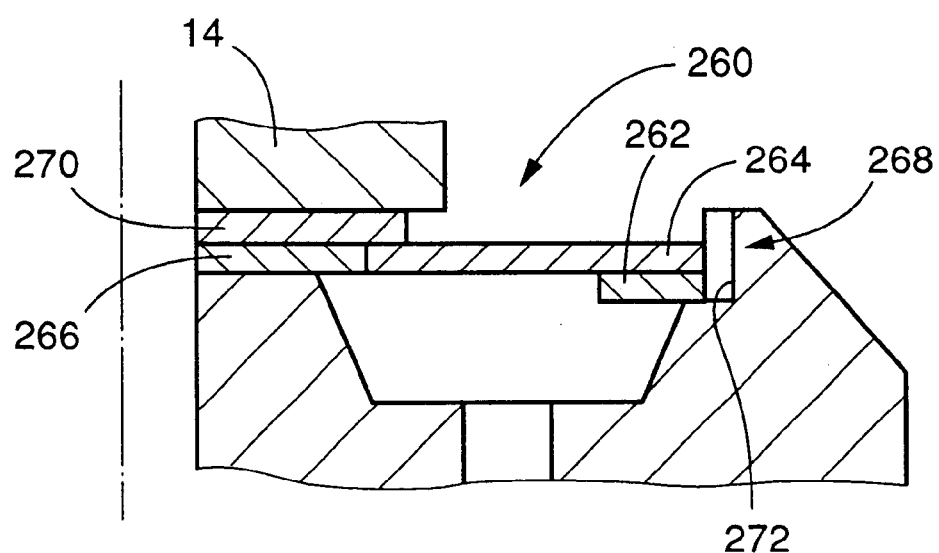
FIG. 23 is a cross sectional view of a soft valve of a shock absorber according to a still further embodiment of the invention.

Referring to FIGS. 23 and 24, there is shown a soft valve 260 according to still another embodiment of the present invention. The soft valve 260 includes two leaf valves 262, 264, an inner positioning member 266, an outer positioning member 268 and an inner seat member 270. The two leaf valves 262, 264 have substantially the same outside diameter, and different inside diameters. The two leaf valves 262, 264 are disposed such that a radially outer portion of the leaf valve 264 is positioned by the inner positioning member 266 while the leaf valve 262 is positioned by the outer positioning member 268. The outer positioning member 268 is disposed at a radially outer portion of the piston 28, and has a plurality of cutouts 272 formed in its inner circumferential surface. The leaf valve 262 is positioned with its outer circumferential surface held in abutting contact with the inner circumferential surface of the outer positioning member 268. The cutouts 272 permit the fluid to flow through the soft valve 260 at a sufficiently high rate, even in an initial period of opening of the soft valve 260.

Figure 24A:
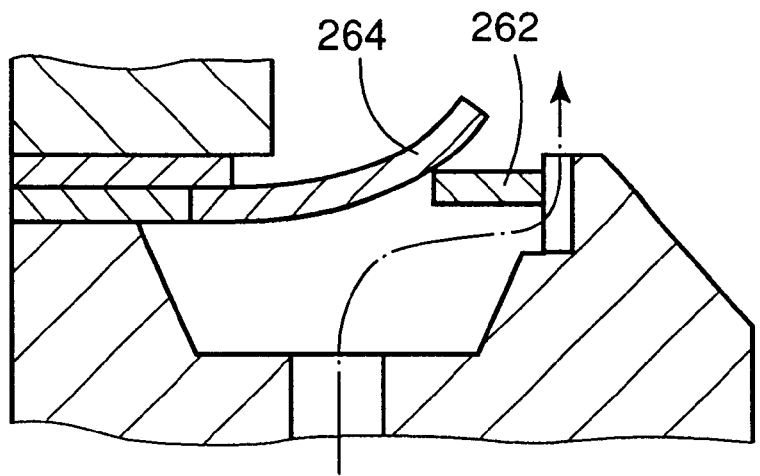
FIGS. 24A and 24B are cross sectional views illustrating an operation of the soft valve of FIG. 23.
Figure 24B:
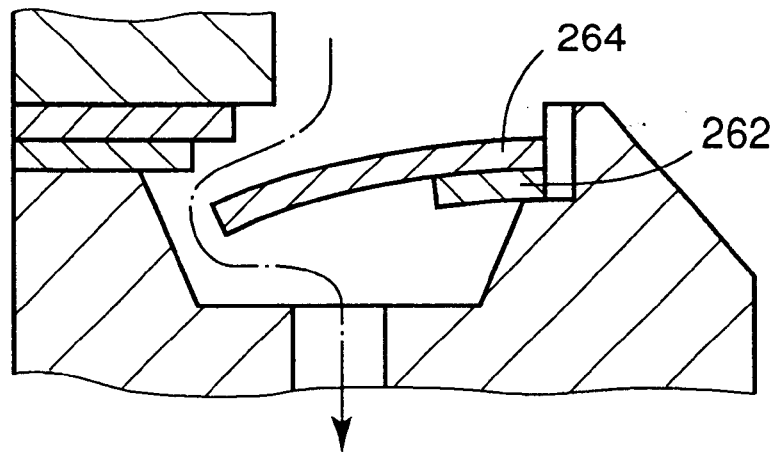

When the shock absorber is contracted, only the leaf valve 264 is flexed with substantially no flexure of the leaf valve 262, as shown in FIG. 24A. When the shock absorber is elongated, however, the two leaf valves 262, 264 are flexed, as shown in FIG. 24B. During the contraction, the leaf valve 264 is flexed with substantially no influence by the leaf valve 262. Thus, the number of the leaf valves to be flexed concurrently during operation of the soft valve 260 changes depending upon whether the shock absorber is contracted or elongated.

The leaf valve 262 may have through-holes and a pressure transmitting portion, like the leaf valve 252 of FIG. 22. In this case, the leaf valve 262 is positioned such that the pressure transmitting portion faces upwards.

Figure 25:
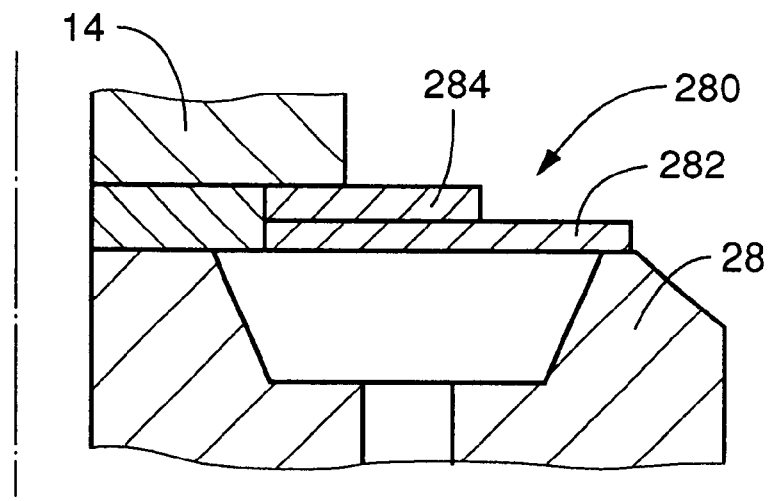
FIG. 25 is a cross sectional view of a soft valve of a shock absorber according to a yet further embodiment of the invention.
Figure 26:
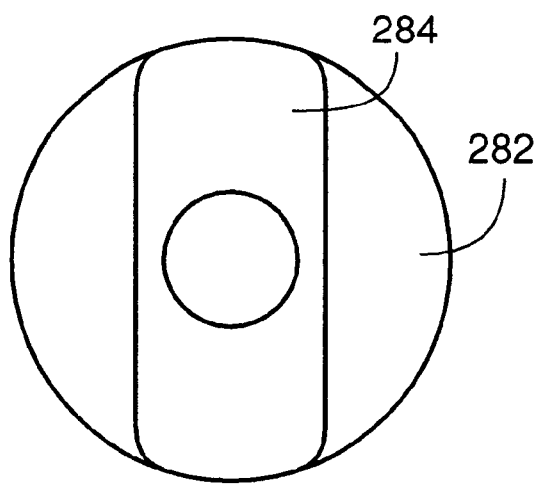
FIG. 26 is a plan view of the soft valve of FIG. 25.

The shock absorber may use a soft valve 280 as shown in FIGS. 25 and 26. The soft valve 280 includes two leaf valves 282, 284. The leaf valve 282 has an annular shape while the leaf valve 284 has a generally rectangular shape, as shown in FIG. 26.

Where the fluid pressure in the intermediate fluid passage 46 is higher than that in the upper chamber 36, only the leaf valve 282 is flexed when the fluid pressure difference is relatively small. When the fluid pressure difference becomes larger than a predetermined threshold, both of the leaf valves 282, 284 are flexed. Where the fluid pressure in the upper chamber 36 is higher than that in the intermediate fluid passage 46, the leaf valves 282, 284 are both flexed, generating a comparatively large damping force.

While the various arrangements of a soft valve including a plurality of leaf valves have been described above by reference to FIGS. 10–26, similar arrangements may be employed for only the hard valve, or for the hard valve as well as the soft valve. The hard valve may be disposed in parallel with a series connection of the soft valve and a fluid passage. The shock absorber may include only one of the hard and soft valves.

Figure 27:
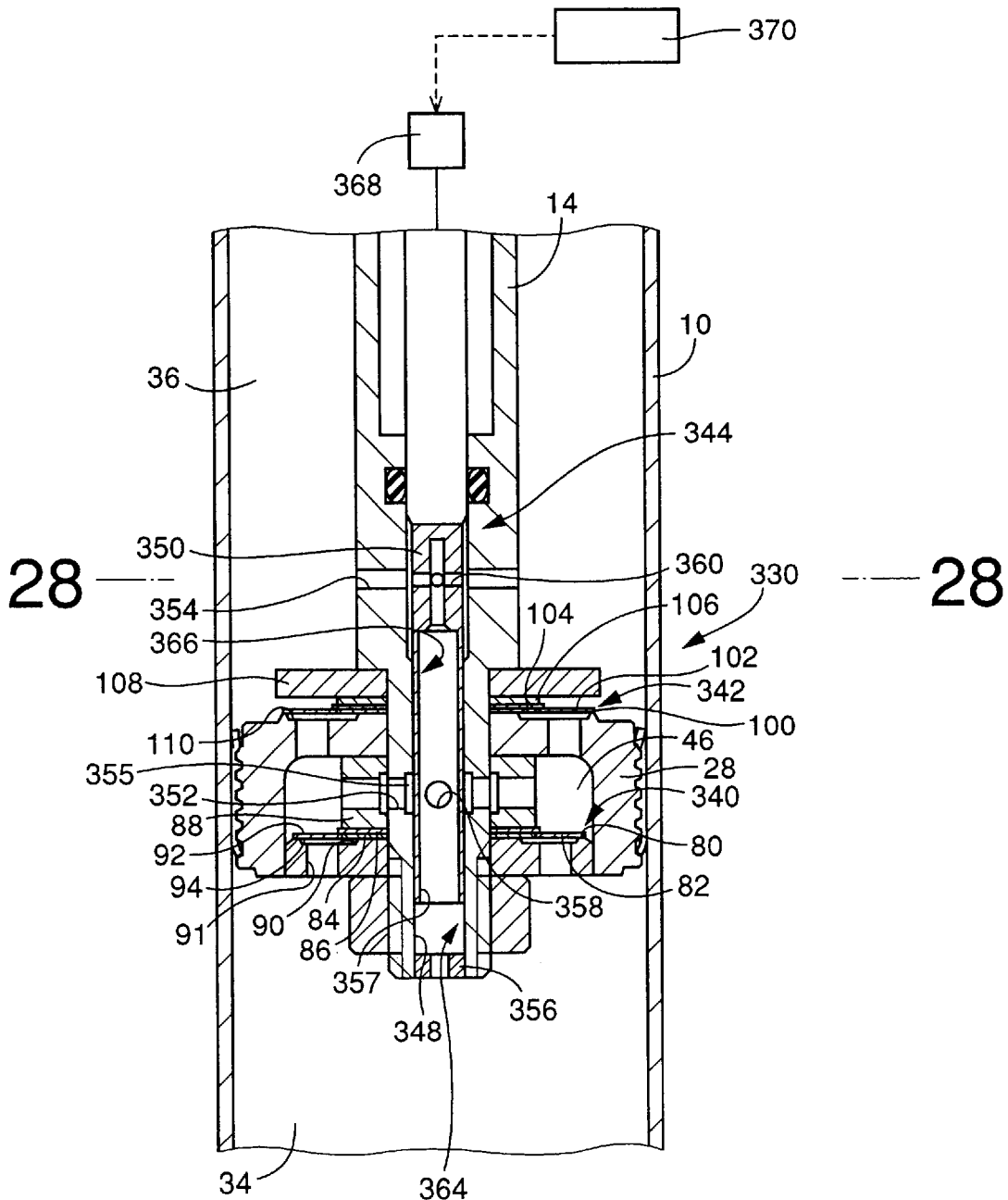
FIG. 27 is a fragmentary elevational view in cross section showing a part of a shock absorber of another embodiment of the invention, which part includes a piston.

Referring to FIGS. 27–30, there will be described a further embodiment of this invention. The same reference numerals as used in the first embodiment of FIGS. 1–6 will be used in FIGS. 27–30 to identify the functionally corresponding elements. As shown in FIG. 27, the shock absorber according to this embodiment includes a damping force control device 330, as well as the cylinder body 10, piston rod 14 and piston 28 which have been described with respect to the first embodiment. The piston 28 fluid-tightly and slidably received within the cylinder body 10 cooperates with the cylinder body 10 to define the upper chamber 36 and the lower chamber 34, as in the first embodiment. The piston rod 14 extends through the piston 28, and the piston 28 is fixed to the end portion of the piston rod 14 by a nut screwed on that end portion. The piston rod 14 and the piston 28 are movable as a unit.

Figure 28:
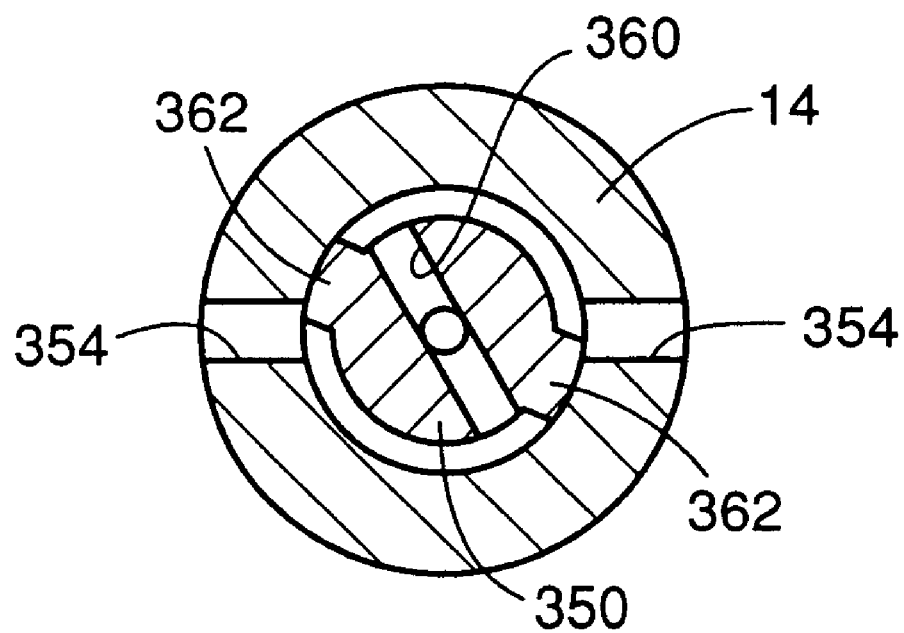
FIG. 28 is a cross sectional view taken along line 28—28 of FIG. 27.

The damping force control device 330 includes a hard valve 340, a soft valve 342 and a variable flow restrictor device 344. The piston rod 14 has an axial hole 348 communicating at its lower end with the lower chamber 34. The piston rod 14 receives a control rod 250 in the axial hole 348 such that the control rod 350 is rotatable relative to the piston rod 14. The piston rod 14 further has radial holes 352 communicating with the intermediate fluid passage 45, as shown in FIG. 26, and radial holes 354 communicating with the upper chamber 36 as also shown in FIG. 28. The piston rod 14 further has an annular groove 355 formed in its inner circumferential surface such that the annular groove 355 communicates with the radial holes 352. A restrictor plug 356 having a relatively small hole is received in the lower end portion of the axial hole 348, so that the axial hole 348 communicates with the lower chamber 36 through the axial hole of the restrictor plug 356.

The control rod 350 has an axial hole 357 consisting of an upper small-diameter portion and a lower large-diameter portion. The control rod 350 further has a radial hole 358 which communicates with the radial holes 352 through the annular groove 355, irrespective of the angular position of the control rod 350 relative to the piston rod 14. That is, the cross sectional are of flow of the fluid between the axial hole 357 and the intermediate fluid passage 46 is held constant irrespective of the angular position of the control rod 350. The control rod 350 also has a radial hole 360 formed at an axial portion thereof aligned with the radial holes 354 formed through the piston rod 14. The above-indicated axial portion of the control rod 350 has diametrically opposite protrusions 362 formed so as to radially protrude from its outer circumferential surface, as shown in FIG. 28. These protrusions 362 are located adjacent to the opposite open ends of the radial hole 360, respectively. In the presence of the protrusions 362, there are left arcuate gaps between the inner circumferential surface of the piston rod 14 and the outer circumferential surface of the control rod 350. These arcuate gaps communicate with the radial hole 360. The cross sectional area of opening of the radial holes 354 with respect to the radial hole 360 through the arcuate gaps varies depending upon the angular position of the control rod 350 relative to the piston rod 14.

The restrictor plug 356, the radial hole 358, and axial portions of the axial holes 348, 357 between the plug 356 and the radial hole 358 cooperate to define a hard-valve by-passing passage 364. The restrictor plug 356 of this hard-valve by-passing passage 364 functions as an orifice.

On the other hand, the radial holes 354, 360, and an axial portion of the axial hole 357 between the radial hole 358 and the radial hole 360 cooperate to define a soft-valve by-passing passage 366. The cross sectional area of fluid flow of this soft-valve by-passing passage 366 varies with the cross sectional area of opening of the radial holes 354 to the radial hole 360, that is, depending upon the angular position of the control rod 350.

The variable flow restrictor device 344 includes the control rod 350, and a rotating device for rotating the control rod 350 relative to the piston rod 14. The rotating device includes an electric motor 368, and a control device 370 for controlling the electric motor 368 so as to control the angular position of the control rod 350 relative to the piston rod 14, for thereby regulating the cross sectional area of fluid flow through the soft-valve by-passing passage 366.

The hard valve 340 and the soft valve 342 are identical in construction with the hard and soft valves 40, 42 of the first embodiment, respectively.

An operation of the present shock absorber will be described by reference to FIGS. 29 and 30.

When a force acts on the piston 28 in the upward direction with the piston rod 14 being moved away from the cylinder body 10, the distance between the two members 12, 16 attached to the wheel and vehicle body, respectively, is increased, that is, the shock absorber is elongated. As a result, the fluid pressure in the upper chamber 36 is made higher than that in the lower chamber 34, so that the fluid is forced to flow from the upper chamber 36 into the lower chamber 34 through the soft-valve by-passing passage 366 and the hard-valve by-passing passage 364.

When the fluid pressure in the upper chamber 36 becomes higher than that in the intermediate fluid passage 46 by more than the predetermined opening pressure difference, the soft valve 342 is opened, and a portion of the fluid is forced to flow through the soft valve 342 and the hard-valve by-passing passage 364. When the fluid pressure in the intermediate fluid passage 46 become higher than that in the lower chamber 34 by more than the predetermined opening pressure difference, the hard valve 340 is opened, so that the fluid is forced to flow from the intermediate fluid passage 46 into the lower chamber 34 through the soft valve 42, soft-valve by-passing passage 366, hard valve 340 and hard-valve by-passing passage 364, as indicated by broken lines in FIG. 29. The manner of operations of the hard and soft valves 340, 342 has been described above with respect to the hard and soft valves 40, 42.

Figure 30A:
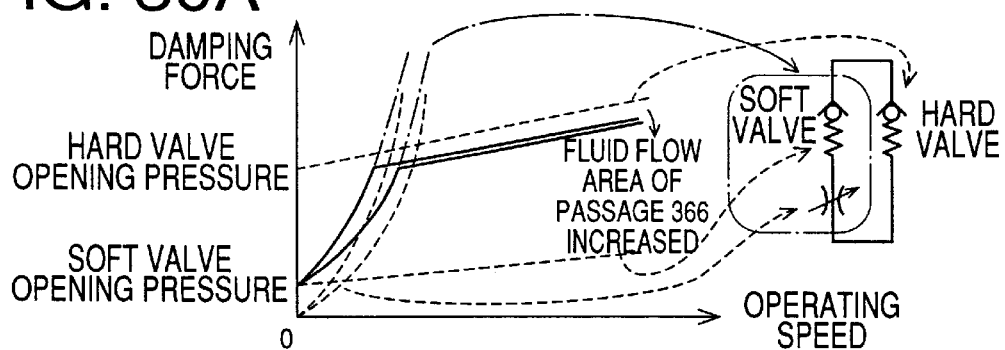
FIGS. 30A, 30B, 30C and 30D are views indicating damping characteristics of different types of shock absorbers.
Figure 30B:
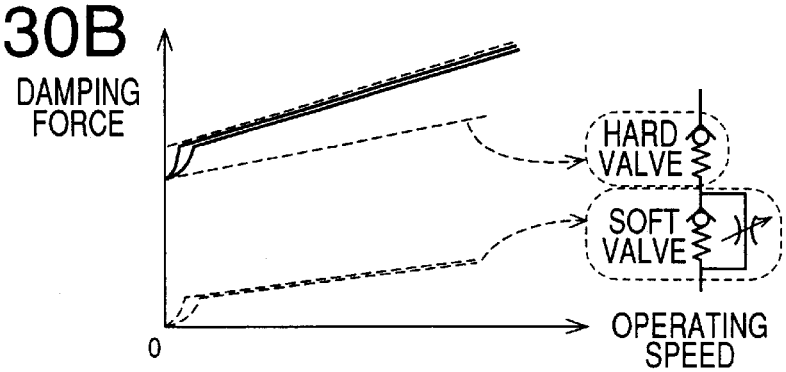
Figure 30C:
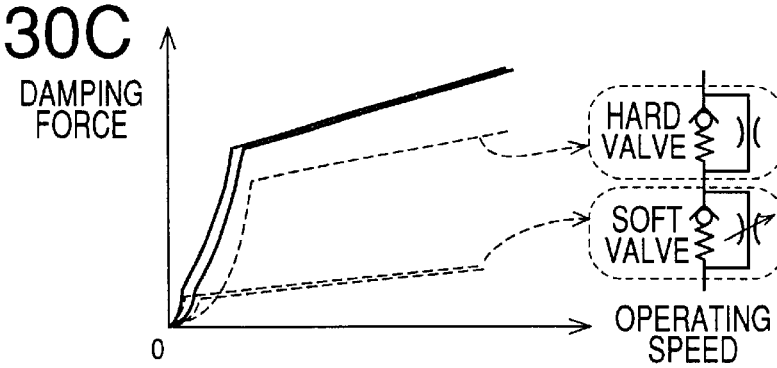

In the present shock absorber, the damping force generated is controlled as indicated by solid lines in FIG. 30C, by controlling the cross sectional area of fluid flow of the soft-valve by-passing passage 366. The damping force can be controlled even while the load acting on the shock absorber is extremely small, that is, even while neither the soft valve 342 nor the hard valve 340 is open. This arrangement permits effective damping of a relatively small vibrational load applied to the motor vehicle, so as to minimize a transient change in the attitude of the running vehicle. The control of the damping force is generally required while the velocity of the relative movement of the piston rod 14 and the cylinder body 10 is considerably low, that is, while the operating speed of the shock absorber is considerably low.

When a load acts on the piston 28 in the downward direction with the piston rod 14 being moved toward the cylinder body 10, the distance between the two members 12, 16 is reduced, that is, the shock absorber is contracted. As a result, the fluid pressure in the lower chamber 34 is made higher than that in the upper chamber 36, so that the fluid is forced to flow from the lower chamber 34 into the upper chamber 36 through the hard-valve by-passing passage 364, hard valve 340, soft-valve by-passing passage 366 and soft valve 342, as indicated by one-dot chain lines in FIG. 29. The damping force is controlled during the contraction of the shock absorber, in the same manner as during the elongation.

When the fluid pressure in the upper chamber 36 becomes higher than that in the intermediate fluid passage 46 by more than the predetermined opening pressure difference, the soft valve 342 is opened, and a portion of the fluid is forced to flow through the soft valve 342 and the hard-valve by-passing passage 364. When the fluid pressure in the intermediate fluid passage 46 become higher than that in the upper chamber 36 by more than the predetermined opening pressure difference, the hard valve 340 is opened, so that the fluid is forced to flow from the intermediate fluid passage 46 into the lower chamber 34 through the soft valve 342, soft-valve by-passing passage 366, hard valve 340 and hard-valve by-passing passage 364, as indicated by broken lines in FIG. 29. The manner of operation of the hard and soft valves 340, 342 has been described above with respect to the hard and soft valves 40, 42.

The present shock absorber permits the control of the damping force which cannot be effected in the conventional shock absorber before the soft valve is opened, that is, while the operating speed of the shock absorber is extremely low. Further, the hard valve 340 and the soft valve 342 provided in the opposite axial portions of the piston 28 permit the fluid flow therethrough during both the elongation and the contraction of the shock absorber. Accordingly, the piston 28 can be simplified in construction and small-sized.

Figure 29:
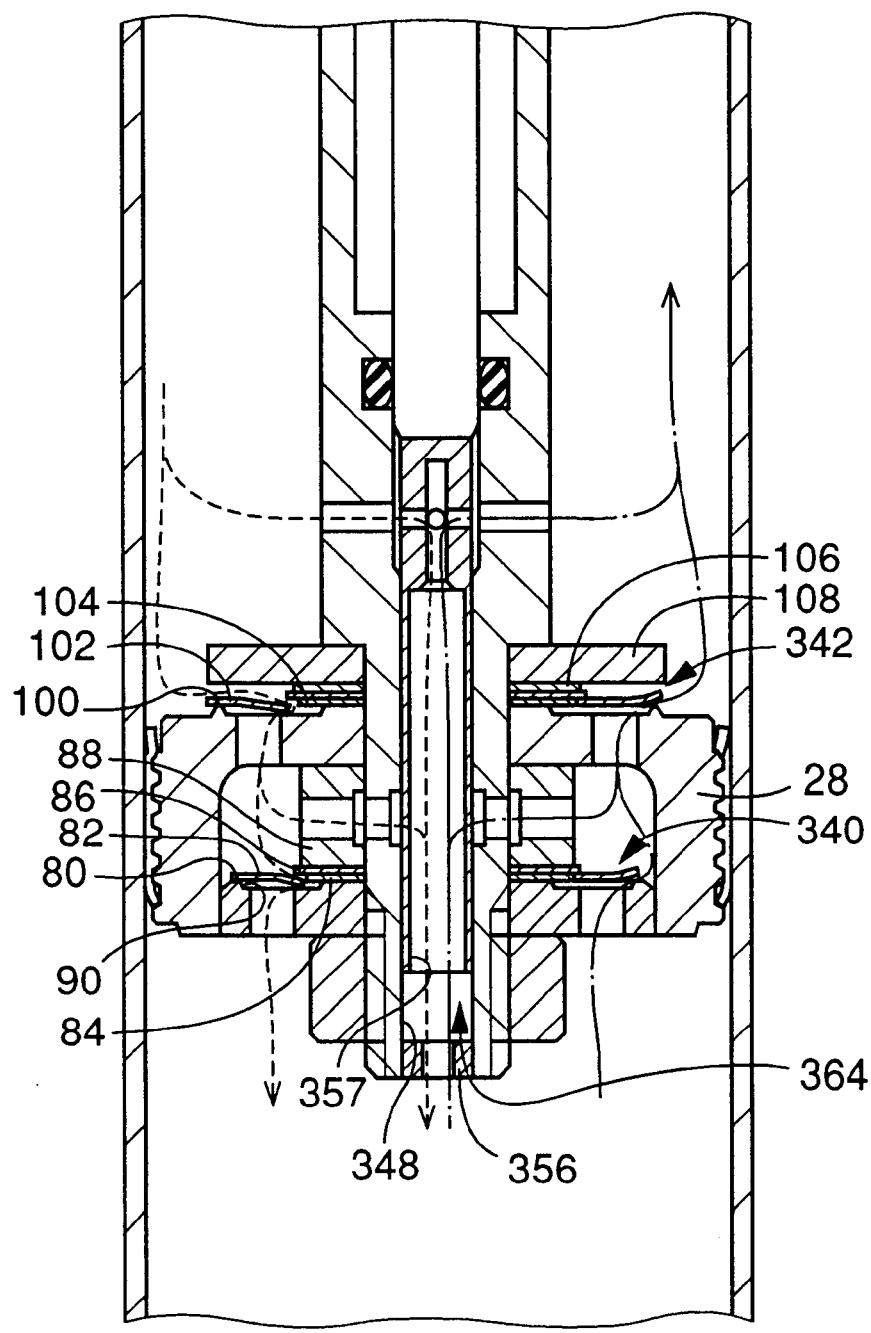
FIG. 29 is a view illustrating an operation of the shock absorber of FIG. 27.
Figure 31:
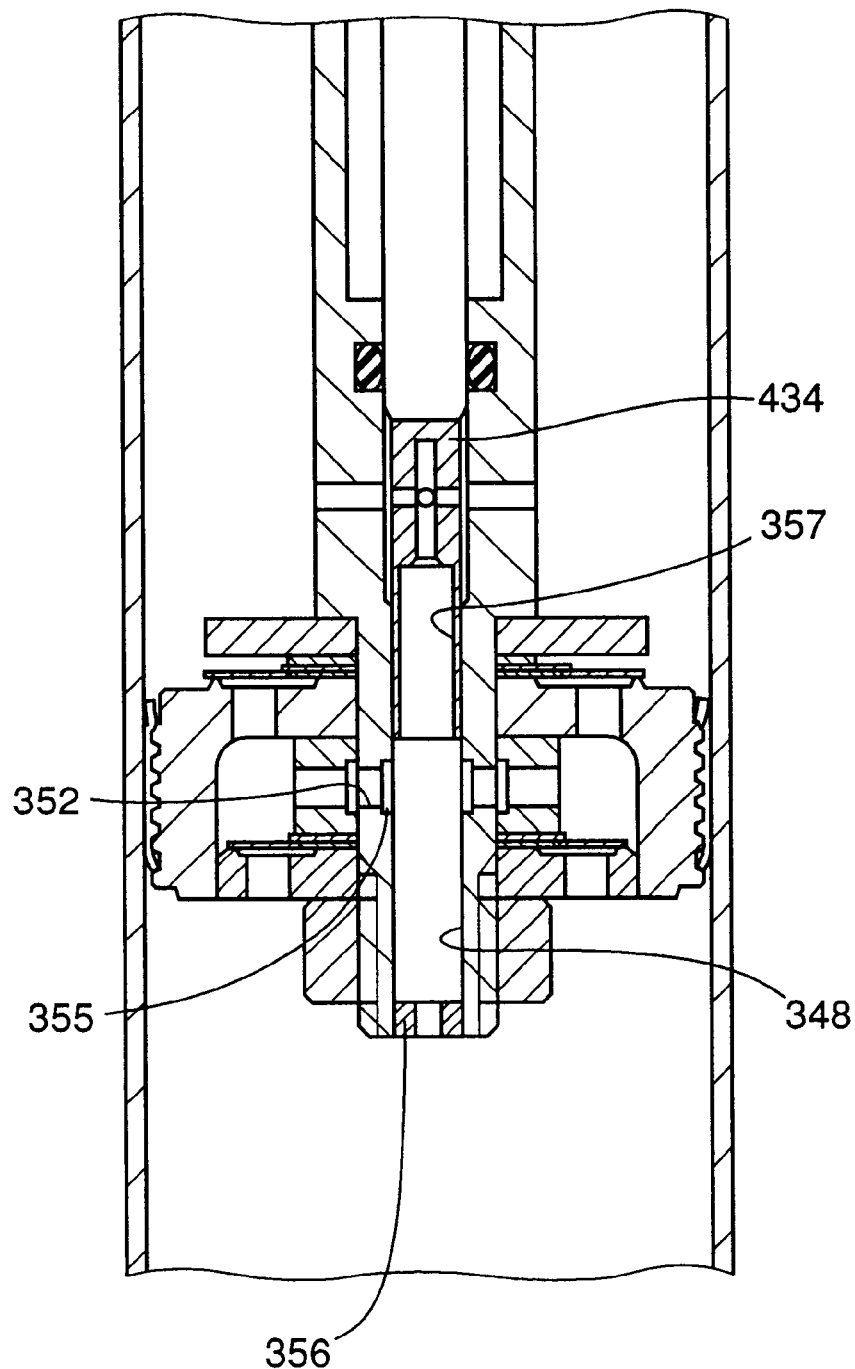
FIG. 31 is a view corresponding to that of FIG. 27, showing a further embodiment of this invention.

In the embodiment of FIGS. 27–29, the cross sectional area of fluid flow of the hard-valve by-passing passage 364 is constant. However, a variable flow restrictor device may be provided for the hard-valve by-passing passage 364. This can be achieved by providing a control rod which is rotatable relative to the control rod 350 and the piston rod 14, or b providing a spool axially movable relative to the control rod 350 and the piston rod 14. Where the cross sectional area of fluid flow of the hard-valve by-passing passage 364 is constant, the shock absorber may use a control rod 434 shown in FIG. 31. This control rod 434 has a smaller length than the control rod 350.

The hard-valve by-passing passage 364 is not essential. Where the passage 364 is not provided, the damping force is controlled as indicated by solid line in FIG. 30B. That is, the damping force can be controlled while the hard valve 340 is open and while the velocity of the relative movement of the piston rod 14 and the cylinder body 10 is extremely low. The hard-valve by-passing passage 364 can be disabled by disconnecting this passage 364 from the lower chamber 34 by a closure plug fitted in the axial hole 348 of the piston rod 14 or the axial hole 357 of the control rod 350.

Figure 30D:
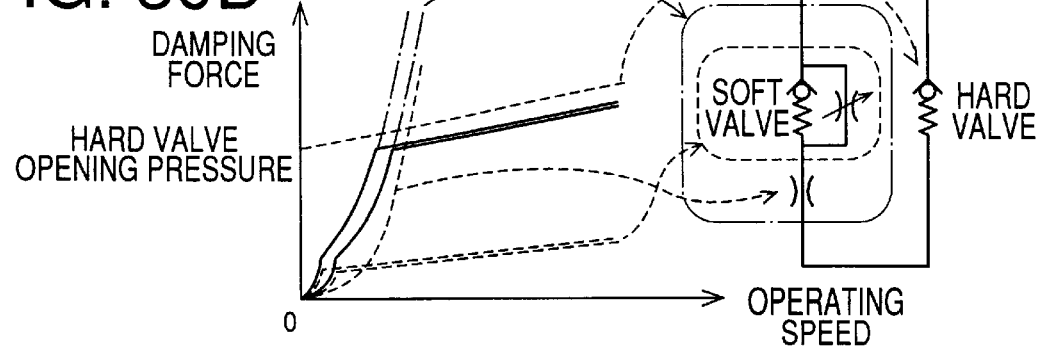

The hard valve may be disposed in parallel with a circuit consisting of a parallel connection of the soft valve and the variable flow restrictor device and a fixed flow restrictor connected in series with that parallel connection, as shown in FIG. 30D. In this arrangement, the damping force can be controlled while the velocity of the relative movement of the piston rod and the cylinder body is extremely low, as shown in FIG. 30D.

The cross sectional area of fluid flow of the soft-valve by-passing passage 366 need not be changed continuously, and may be changed in steps. Further, the flow restrictor device may be adapted to place the soft-valve by-passing passage in one of the fully open and closed states. While the variable flow restrictor device 344 is of a rotary valve type using the rotatable control rod, the variable flow restrictor device may be of a linear valve type using a spool axially movable relative to the piston rod 14. In this case, the variable flow restrictor device requires a motion converting mechanism for converting the rotary motion of the electric motor 368 into a liner motion of the spool.

Figure 32:
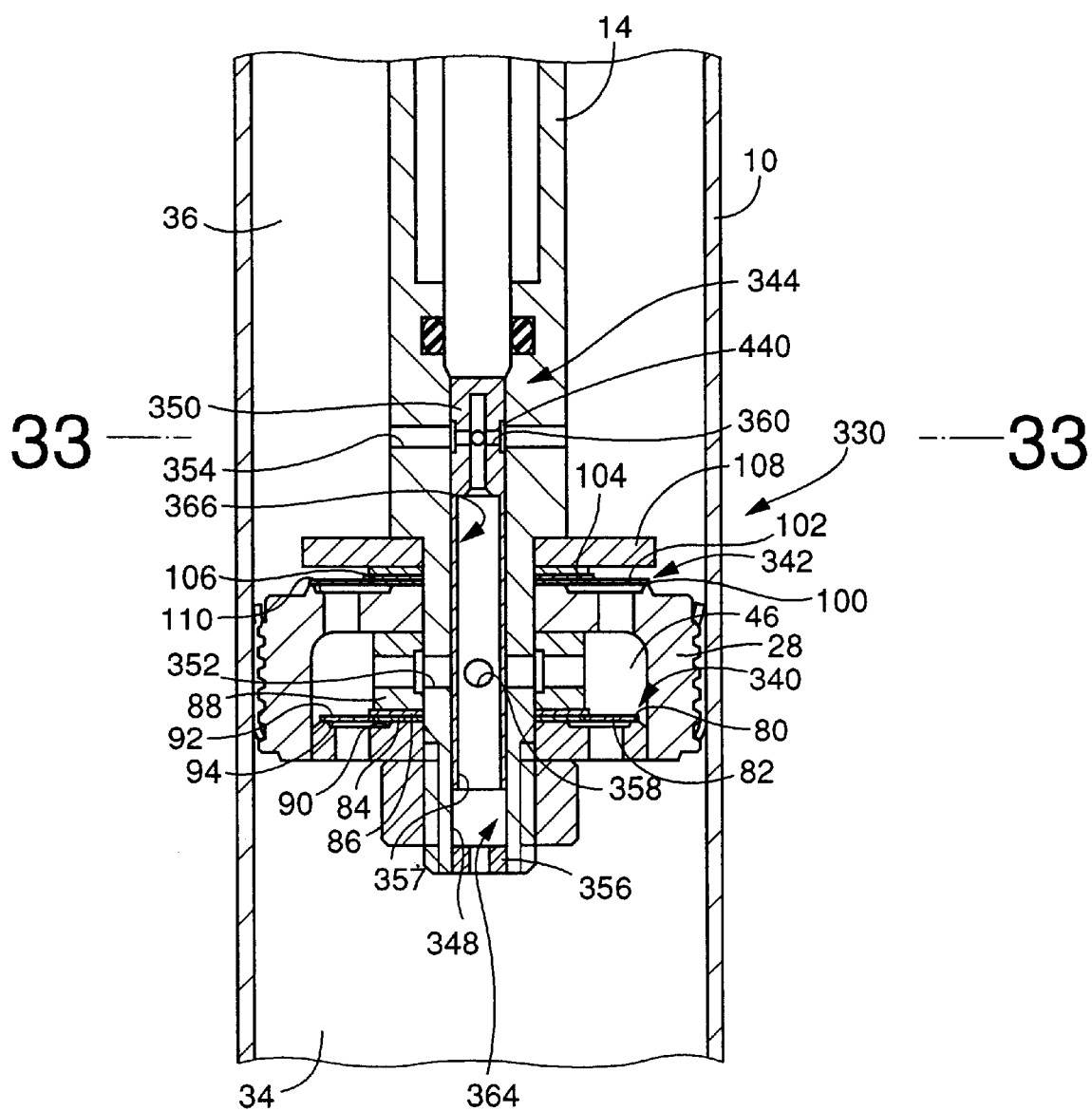
FIG. 32 is a view corresponding to that of FIG. 27, showing a still further embodiment of the invention
Figure 33:
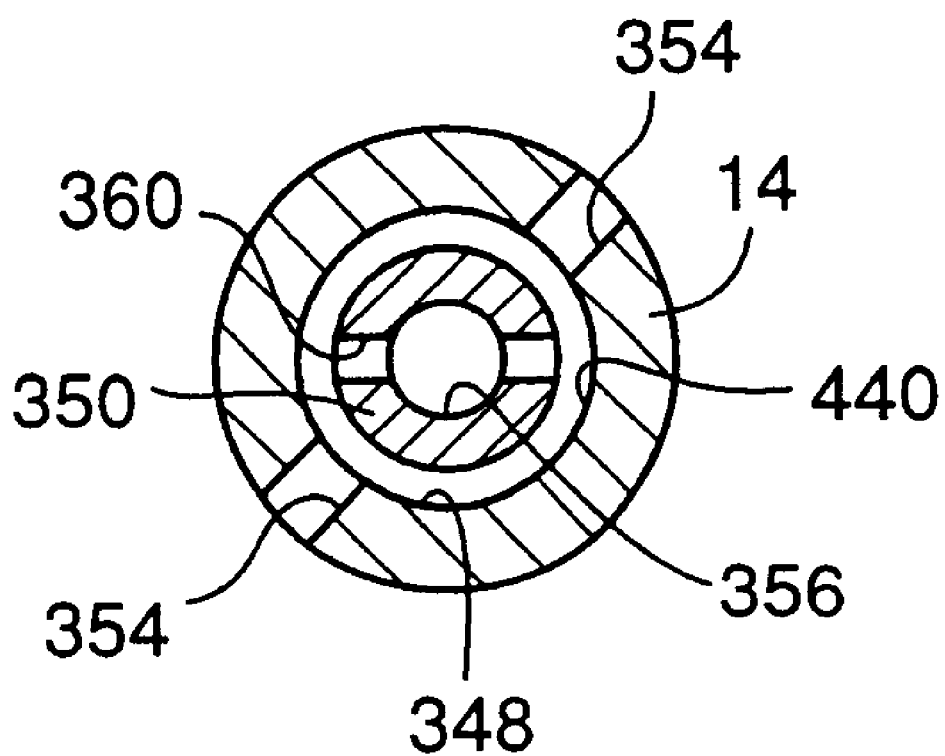
FIG. 33 is a cross sectional view taken along line 33—33 of FIG. 32.

Referring to FIGS. 32 and 33, there is shown a still further embodiment of this invention, wherein the cross sectional area of fluid flow of the soft-valve by-passing passage 366 is changed by controlling the cross sectional area of opening of the axial hole 357 with respect to the intermediate fluid passage 36, rather than by controlling the cross sectional area of opening of the radial holes 354 with respect to the radial hole 360 in the preceding embodiment of FIGS. 37–29. Described more specifically, the piston rod 14 does not have the annular groove 355 (FIG. 27), and the cross sectional area of opening of the radial hole 358 to the radial holes 352 is controlled by changing the angular position of the control rod 350. In this case, the piston rod 14 has an annular groove 440 formed in its inner circumferential surface such that the radial hole 360 communicates with the radial holes 354 through the annular groove 440, irrespective of the angular position of the control rod 350.

The hard-valve by-passing passage 364 may be considered to include the radial holes 352 and the annular groove 355, as well as the axial holes 348, 357 and restricting plug 356.

Figure 34:
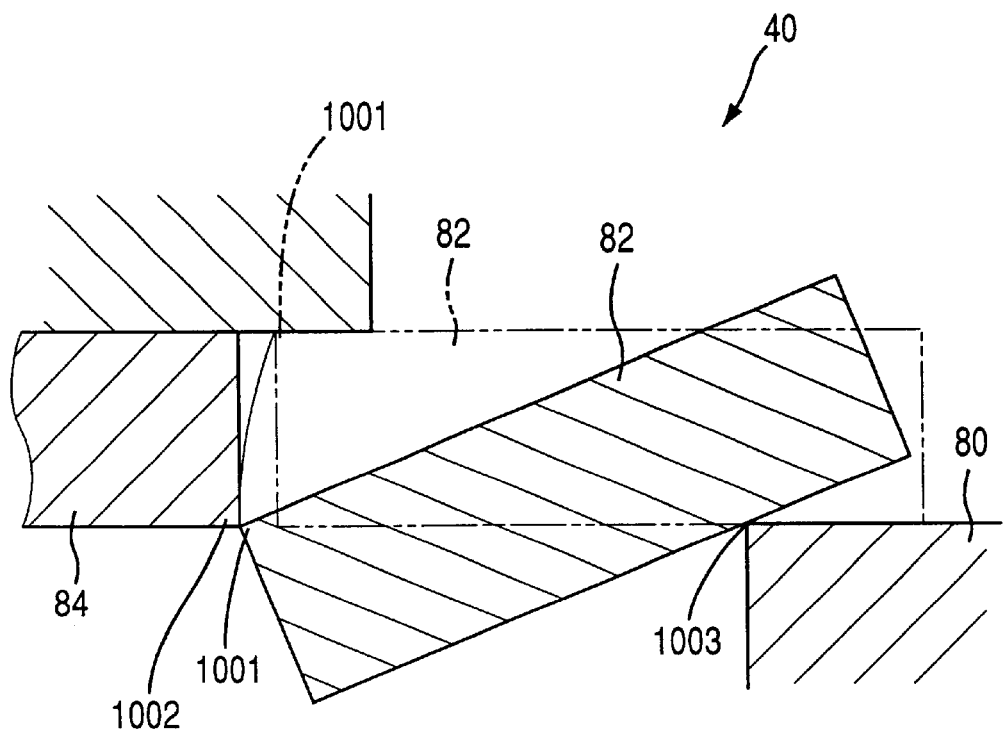
FIG. 34 is a cross sectional view showing a yet further embodiment of this invention.

Referring to FIG. 34, there is shown a yet further embodiment of this invention, which is identical with the first embodiment of FIGS. 1–6, except for a clearance provided between the radially outer periphery of the annular ran positioning member 84 and the radially inner periphery of the leaf valve 82 of the hard valve 40.

When the hard valve 40 of FIG. 34 is placed in its closed position indicated by two-dot chain line, there is a considerably small amount of clearance between the inner circumferential surface of the leaf valve 72 and the outer circumferential surface of the positioning member 84. When the leaf valve 82 is flexed at its radially inner portion, an upper corner or edge 1001 of the radially inner periphery of the leaf valve 82 slightly interferes with a lower corner or edge 1002 of the radially outer periphery of the positioning member, as indicated by solid line in FIG. 34. For easier understanding, FIG. 34 shows that the leaf valve 82 and the positioning member 84 have larger thickness values than the actual values, and that the leaf valve 82 is simply pivoted about a radially inner edge 1003 of the outer seat 80 from the closed position of the two-dot chain line to the open position of the solid line when the leaf valve 82 is opened. When the leaf valve 82 is pivoted, the upper edge 1001 of the leaf valve 82 initially located at the position of the two-dot chain line is moved toward the inner circumferential surface of the positioning member 84, and is eventually brought into contact with the lower edge 1002 of the positioning member 84. Actually, however, the leaf valve 82 is flexed about the inner edge 1003 of the outer seat 80, such that the leaf valve 82 is elastically deformed to have an upwardly convex shape. At this time, the leaf valve 82 is neither elongated nor contracted at its intermediate or neutral plane which is parallel to the upper and lower surfaces and includes the centerline passing the center of its thickness, but is elongated at its upper surface and contaracted at its lower surface. The elongation of the upper surface causes the upper edge 1001 to move toward the inner circumferential surface of the positioning member 84, so that the upper edge 1001 eventually interferes with the lower edge 1002 of the positioning member 84.

The amount of interference between the upper edge 1001 of the leaf valve 82 and the lower edge 1002 of the positioning member 84 can be changed by changing a difference between the inside diameter of the leaf valve 82 and the outside diameter of the positioning member 84, that is, by changing the clearance between the inner circumferential surface of the leaf valve 82 and the outer circumferential surface of the positioning member 84. It will be understood that the opening pressure difference of the hard valve 40 increases with an increase in the amount of interference between the edges or corners 1001 and 1002. Thus, the desired opening pressure difference of the hard valve 40 may be obtained by suitably determining the amount of clearance between the circumferential inner surface of the leaf valve 82 and the outer circumferential surface of the positioning member 84.

It is noted that the leaf valve 82 does not necessarily have an accurately coaxial relationship with the positioning member 84 immediately after the assembling of the hard valve 40. With the hard valve 40 being opened and closed several times, however, the slight amount of interference of the upper edge 1001 of the leaf valve 82 with the lower edge 1002 of the positioning member 84 permits the leaf valve 82 to become accurately coaxial with the positioning member 84, so that the amount of clearance between the inner circumferential surface of the leaf valve 82 and the outer circumferential surface of the positioning member 84 is made substantially constant over the entire circumference of the leaf valve 82.

Accordingly, the amount of interference between the upper edge 1001 of the leaf valve 82 and the lower edge 1002 of the positioning member 84 upon opening of the hard valve 40 is made substantially constant over the entire circumference of the leaf valve 82, assuring substantially constant amount of opening of the hard valve 40 over the entire circumference, thereby making it possible to adjust the opening pressure difference of the hard valve 40 upon flexure of the leaf valve 82 at its radially inner portion, without an influence on the opening pressure difference of the hard valve 40 upon flexure of the leaf value 82 at its radially outer portion.

In other words, the accuracy of the coaxial positioning of the leaf valve 82 with respect to the positioning member 84 can be improved by reducing the amount of clearance between the inner and outer circumferential surfaces of the leaf valve 82 and positioning member 84, to increase the amount of interference of the edges 1001, 1002. This positioning feature by adjustment of the clearance can be provided alone, without the feature of the adjustment of the opening pressure difference by adjustment of the clearance.

In this instance, the amount of clearance between the inner and outer circumferential surfaces of the leaf valve 82 and positioning member 84 is selected to be slightly larger than the amount which causes the edges 1001 and 1002 to just contact with each other over the entire circumference of the leaf valve 82. For instance, the amount of clearance (radial value) is held within a range of 0–0.05 mm, preferably, 0–0.02 mm, and more preferably 0–0.01 mm.

The principle of the above embodiment of FIG. 34 regarding the clearance between the positioning member and the leaf valve may also be employed in the soft valve 42.

While the presently preferred embodiments of the present invention have been described above by reference to the accompanying drawings, it is to be understood that the present invention may be embodied with various changes, modifications and improvements, which may occur to those skilled in the art, without departing from the spirit and scope of the invention defined in the appended claims.

What is claimed is:

1. A shock absorber comprising:

a cylinder body;

a piston received in said cylinder body and cooperating with said cylinder body to define two chambers on opposite sides of said piston, one and the other of said two chambers respectively functioning as a high-pressure chamber and a low-pressure chamber in which a pressure of a working fluid is lower than that in said high-pressure chamber;

a piston rod fixed to said piston;

a damping force control device including (i) a hard valve which permits a flow of said working fluid from said high-pressure chamber toward said low-pressure chamber when a difference between the pressures in the high-pressure and low-pressure chambers is larger than a predetermined threshold, (ii) a soft valve which permits the flow of the working fluid from said high-pressure chamber toward said low-pressure chamber when said difference is not larger than said threshold, and (iii) a flow restricting fluid passage which has a function of restricting a flow of the working fluid therethrough and which is disposed in parallel with at least one of said hard valve and said soft valve; and at least one of said hard valve and said soft valve permits a flow of said working fluid therethrough from said high-pressure chamber toward said low-pressure chamber during both elongation and contraction of an assembly consisting of said cylinder body and said piston rod.

2. A shock absorber comprising:

a cylinder body;

a piston received in said cylinder body and cooperating with said cylinder body to define two chambers on opposite sides of said piston, one and the other of said two chambers respectively functioning as a high-pressure chamber and a low-pressure chamber in which a pressure of a working fluid is lower than that in said high-pressure chamber;

a piston rod fixed to said piston;

a damping force control device including (i) a hard valve which permits a flow of said working fluid from said high-pressure chamber toward said low-pressure chamber when a difference between the pressures in the high-pressure and low-pressure chambers is larger than a predetermined threshold, (ii) a soft valve which permits the flow of the working fluid from said high-pressure chamber toward said low-pressure chamber when said difference is not larger than said threshold, and (iii) a variable flow restrictor device for controlling a cross sectional area of flow of the working fluid through a hard-valve by-passing passage formed in parallel with said hard valve;

both of said hard valve and said soft valve permitting a flow of said working fluid therethrough from said high-pressure chamber toward said low-pressure chamber during both elongation and contraction of an assembly consisting of said cylinder body and said piston rod; and said hard and soft valves being disposed in respective two axially opposite portions of said piston which partially define said two chambers, respectively, said piston having an intermediate fluid passage connecting said hard and soft valves, said hard-valve by-passing passage being open at one of opposite ends thereof to one of said two chambers which is located on the side of said hard valve, and at the other end thereof to said intermediate fluid passage.

3. A shock absorber according to claim 2, wherein each of at least one of said hard and soft valves includes (a) a leaf valve in the form of a generally annular sheet member having opposite surfaces one of which is exposed to one of said two chambers and the other of which is exposed to said intermediate fluid passage, (b) a first seat member for supporting said leaf valve at one of radially inner and outer peripheral portions thereof, on the side of said one of said two chambers, and (c) a second seat member for supporting said leaf valve at the other of said radially inner and outer peripheral portions, on the side of said intermediate fluid passage.

4. A shock absorber according to claim 2, wherein each of said at least one of said hard and soft valves includes a leaf valve in the form of a generally annular sheet member, and a positioning member disposed on one of radially inner and outer sides of said leaf valve, for positioning said leaf valve such that said positioning member engages said leaf valve, said positioning member having cutouts formed in one of radially inner and outer peripheral portions thereof which corresponds to the other of said radially inner and outer sides of said leaf valves.

5. A shock absorber according to claim 2, wherein said hard and soft valves include respective leaf valves each in the form of a generally annular sheet member, said leaf valve of said soft valve being more flexible than said leaf valve of said hard valve.

6. A shock absorber comprising:

a cylinder body;

a piston received in said cylinder body and cooperating with said cylinder body to define two chambers on opposite sides of said piston, one and the other of said two chambers respectively functioning as a high-pressure chamber and a low-pressure chamber in which a pressure of a working fluid is lower than that in said high-pressure chamber;

a piston rod fixed to said piston;

a damping force control device including (i) a hard valve which permits a flow of said working fluid from said high-pressure chamber toward said low-pressure chamber when a difference between the pressures in the high-pressure and low-pressure chambers is larger than a predetermined threshold, (ii) a soft valve which permits the flow of the working fluid from said high-pressure chamber toward said low-pressure chamber when said difference is not larger than said threshold, and (iii) a flow restricting hard-valve by-passing passage which has a function of restricting a flow of the working fluid therethrough and which is disposed in parallel with said hard valve; and at least one of said hard valve and said soft valve permitting a flow of said working fluid therethrough from said high-pressure chamber toward said low-pressure chamber during both elongation and contraction of an assembly consisting of said cylinder body and said piston rod.

7. A shock absorber comprising:

a cylinder body;

a piston received in said cylinder body and cooperating with said cylinder body to define two chambers on opposite sides of said piston, one and the other of said two chambers respectively functioning as a high-pressure chamber and a low-pressure chamber in which a pressure of a working fluid is lower than that in said high-pressure chamber;

a piston rod fixed to said piston;

a damping force control device including (i) a hard valve which permits a flow of said working fluid from said high-pressure chamber toward said low-pressure chamber when a difference between the pressures in the high-pressure and low-pressure chambers is larger than a predetermined threshold, (ii) a soft valve which permits the flow of the working fluid from said high-pressure chamber toward said low-pressure chamber when said difference is not larger than said threshold, and (iii) a flow restricting hard-valve by-passing passage which has a function of restricting a flow of the working fluid therethrough and which is disposed in parallel with said hard valve; and both of said hard valve and said soft valve permitting a flow of said working fluid therethrough from said high-pressure chamber toward said low-pressure chamber during both elongation and contraction of an assembly consisting of said cylinder body and said piston rod, said hard and soft valves being disposed in respective two axially opposite portions of said piston which partially define said two chambers, respectively; and said piston having an intermediate fluid passage connecting said hard and soft valves, said flow restricting hard-valve by-passing passage being open at one of opposite ends thereof to one of said two chambers which is located on the side of said hard valve, and at the other end thereof to said intermediate fluid passage.

8. A shock absorber comprising:

a cylinder body;

a piston received in said cylinder body and cooperating with said cylinder body to define two chambers on opposite sides of said piston, one and the other of said two chambers respectively functioning as a high-pressure chamber and a low-pressure chamber in which a pressure of a working fluid is lower than that in said high-pressure chamber;

a piston rod fixed to said piston;

a damping force control device including (i) a hard valve which permits a flow of said working fluid from said high-pressure chamber toward said low-pressure chamber when a difference between the pressures in the high-pressure and low-pressure chambers is larger than a predetermined threshold, (ii) a soft valve which permits the flow of the working fluid from said high-pressure chamber toward said low-pressure chamber when said difference is not larger than said threshold, (iii) a flow restricting soft-valve by-passing passage which has a function of restricting a flow of the working fluid therethrough and which is disposed in parallel with said soft valve, and (iv) a variable flow restrictor device for controlling a cross sectional area of flow of the fluid through said flow restricting soft-valve by-passing passage.

9. A shock absorber according to claim 8, wherein said hard valve and said soft valve are connected in series with each other.

10. A shock absorber according to claim 9, wherein said damping force control device further includes a flow restricting hard-valve by-passing passage which has a function of restricting a flow of the working fluid therethrough and which is disposed in parallel with said hard valve.

11. A shock absorber according to claim 8, wherein at last one of said hard valve and said soft valve permits a flow of said working fluid therethrough from said high-pressure chamber toward said low-pressure chamber during both elongation and contraction of an assembly consisting of said cylinder body and said piston rod.

12. A shock absorber according to claim 8, wherein both of said hard valve and said soft valve permit the flow of said working fluid therethrough from said high-pressure chamber toward said low-pressure chamber during both elongation and contraction of an assembly consisting of said cylinder body and said piston rod, and said hard and soft valves are disposed in respective two axially opposite portions of said piston (28) which partially define said two chambers, respectively.

13. A shock absorber according to claim 8, wherein said piston has an intermediate fluid passage connecting said hard and soft valves, and each of at least one of said hard and soft valves includes (a) a leaf valve in the form of a generally annular sheet member having opposite surfaces one of which is exposed to one of said two chambers and the other of which is exposed to said intermediate fluid passage, (b) a first seat member for supporting said leaf valve at one of radially inner and outer peripheral portions thereof, on the side of said one of said two chambers, and (c) a second seat member for supporting said leaf valve at the other of said radially inner and outer peripheral portions, on the side of said intermediate fluid passage.

14. A shock absorber according to claim 8, wherein both of said hard and soft valves include respective leaf valves each in the form of a generally annular sheet member, said leaf valve of said soft valve is more flexible than said leaf valve of said hard valve.

15. A shock absorber comprising:

a cylinder body;

a piston received in said cylinder body and cooperating with said cylinder body to define two chambers on opposite sides of said piston, one and the other of said two chambers respectively functioning as a high-pressure chamber and a low-pressure chamber in which a pressure of a working fluid is lower than that in said high-pressure chamber;

a piston rod fixed to said piston;

a damping force control device including (i) a hard valve which permits a flow of said working fluid from said high-pressure chamber toward said low-pressure chamber when a difference between the pressures in the high-pressure and low-pressure chambers is larger than a predetermined threshold, (ii) a soft valve which permits the flow of the working fluid from said high-pressure chamber toward said low-pressure chamber when said difference is not larger than said threshold, and (iii) at least one of (a) a first variable flow restrictor device for controlling a cross sectional area of flow of the fluid through a soft-valve by-passing passage which is disposed in parallel with said soft valve, and (b) a second variable flow restrictor device for controlling a cross sectional area of flow of the fluid through a hard-valve by-passing passage which is disposed in parallel with said hard valve; and at least one of said hard valve and said soft valve permitting a flow of said working fluid therethrough from said high-pressure chamber toward said low-pressure chamber during both elongation and contraction of an assembly consisting of said cylinder body and said piston rod.

16. A shock absorber; comprising:

a cylinder body;

a piston received in said cylinder body and cooperating with said cylinder body to define two chambers on opposite sides thereof, one and the other of said two chambers respectfully functioning as a high-pressure chamber and a low-pressure chamber in which a pressure of a working fluid is lower than that in said high-pressure chamber;

a piston rod fixed to said piston;

a valve device which permits a flow of said working fluid from said high-pressure chamber toward said low-pressure chamber;

and wherein said valve device includes two leaf valves superposed on each other and consisting of a first leaf valve and a second leaf valve which has two portions, and wherein said first and second leaf valves are arranged such that said first leaf valve is superposed on one of said two portions of said second leaf valve and is not superposed on the other of said two portions of said second leaf valve, and such that the number of said leaf valves to be flexed concurrently changes depending upon an operating state of the shock absorber, and such that both of said first and second leaf valves are flexed with substantially no separation thereof from each other, for thereby permitting said flow of said working fluid when two of the leaf valves are flexed and such that said second leaf valve is flexed while said first leaf valve is displaced as a result of the flexure of said second leaf valve which serves as a flexing fulcrum for supporting said first leaf valve when said second leaf valve is flexed, for thereby permitting said flow of said working fluid when one of the leaf valves is flexed.

17. A shock absorber according to claim 16, wherein said valve device permits said flow of said working fluid from said high-pressure chamber toward said low-pressure chamber during both elongation and contraction of an assembly consisting of said cylinder body and said piston rod, and wherein said number of said leaf valves to be flexed concurrently changes depending upon whether said assembly is elongated or contracted.

* * * * *